United States Patent [19]
Butler et al.

[11] Patent Number: 5,896,569
[45] Date of Patent: Apr. 20, 1999

[54] WIRELESS ACCESS TO TELEPHONE NETWORK DIAL TONE

[75] Inventors: Myron C. Butler, Edmond, Okla.; Lawrence O. Hilligoss; George Alter, both of Ashland, Oreg.

[73] Assignee: Communications Manufacturing Company, Los Angeles, Calif.

[21] Appl. No.: 08/649,772

[22] Filed: May 15, 1996

[51] Int. Cl.⁶ .................................................. H04Q 7/34
[52] U.S. Cl. .................... 455/423; 455/434; 455/425; 455/437; 455/525
[58] Field of Search .................................. 455/425, 434, 455/437, 515, 525, 440, 572, 422, 343, 423, 574; 379/413, 93.05, 27, 21, 37, 42; 320/DIG. 13, DIG. 36; 340/644, 506, 870.03, 505, 827.47, 870.11, 309.4

[56] References Cited

U.S. PATENT DOCUMENTS

| | | | |
|---|---|---|---|
| 4,380,687 | 4/1983 | Stewart | 320/107 |
| 4,803,719 | 2/1989 | Ulrich | 379/413 X |
| 4,837,811 | 6/1989 | Butler et al. | 379/96 |
| 4,922,516 | 5/1990 | Butler et al. | 379/21 |
| 5,136,281 | 8/1992 | Bonaquist | 320/36 |
| 5,377,259 | 12/1994 | Butler et al. | 379/93 |
| 5,461,558 | 10/1995 | Patsiokas et al. | 340/309.4 X |
| 5,481,259 | 1/1996 | Bane | 340/505 |
| 5,521,958 | 5/1996 | Selig et al. | 455/423 X |
| 5,528,660 | 6/1996 | Heins et al. | 379/21 |
| 5,533,093 | 7/1996 | Horton et al. | 379/21 |
| 5,553,138 | 9/1996 | Heald et al. | 455/572 X |
| 5,583,912 | 12/1996 | Schillaci et al. | 379/21 |
| 5,592,528 | 1/1997 | Nelson et al. | 379/21 |

*Primary Examiner*—Wellington Chin
*Assistant Examiner*—Yemane Woldetatios
*Attorney, Agent, or Firm*—McAfee & Taft

[57] ABSTRACT

A system and method for providing wireless access to a telephone line of a telephone network utilize a mobile terminal and a crossconnect base station. The mobile terminal transmits a radio frequency signal carrying a telephone communication. The crossconnect base station connects to a telephone line at a crossconnect box of a telephone network, receives the radio frequency signal carrying a telephone communication, and communicates the telephone communication over a connected telephone line. Other aspects of the system and method of the present invention include: (1) providing a wakeup signal from the mobile terminal to the crossconnect base station so that the base station can be powered down when not in use, thereby conserving energy; (2) receiving both the wakeup signal and the primary communication signal (which can carry data and/or voice) through a single antenna connected to the base station at the respective crossconnect box; and (3) recharging one or more batteries in the base station from an energy source of the telephone network.

20 Claims, 16 Drawing Sheets

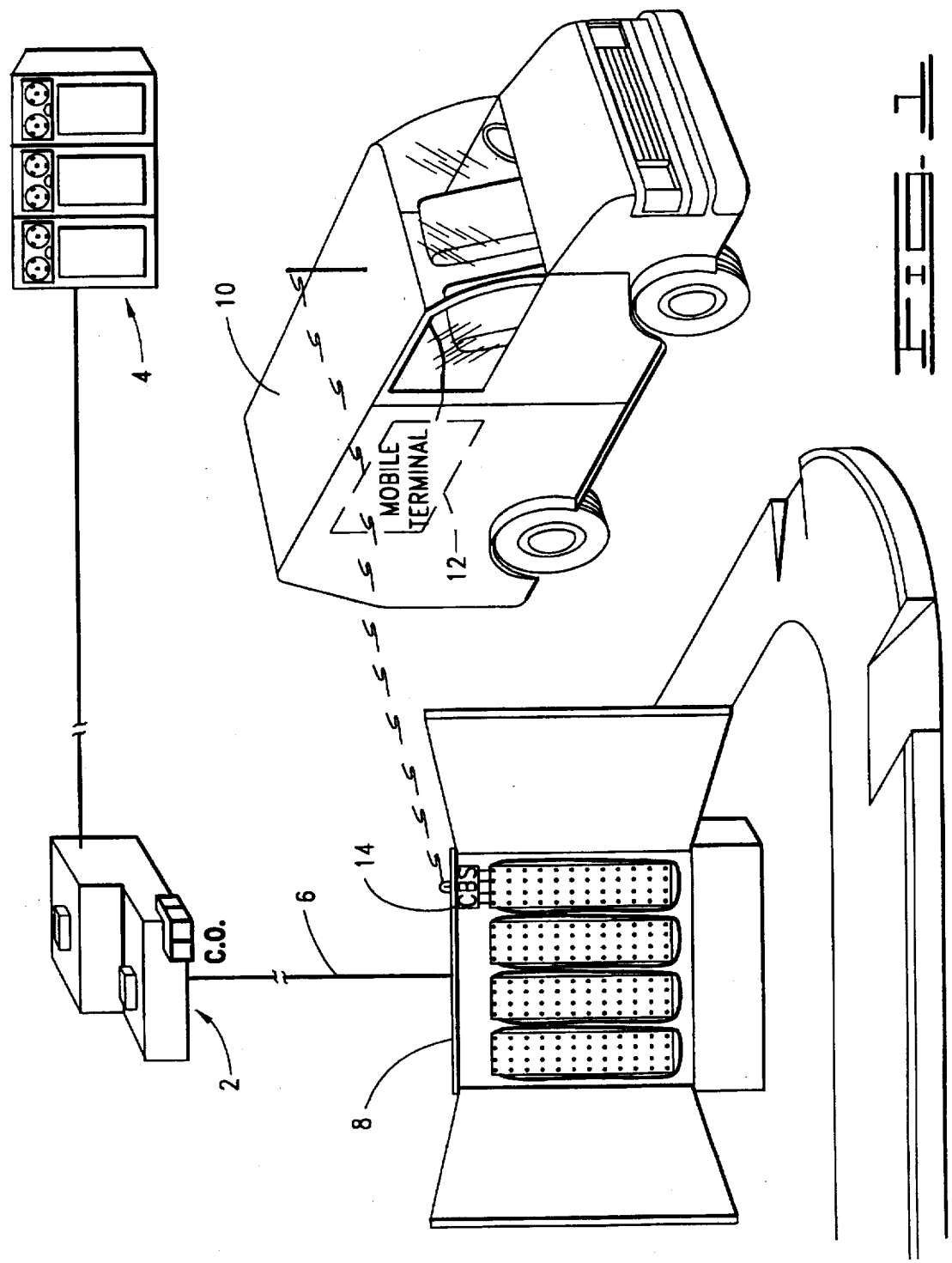

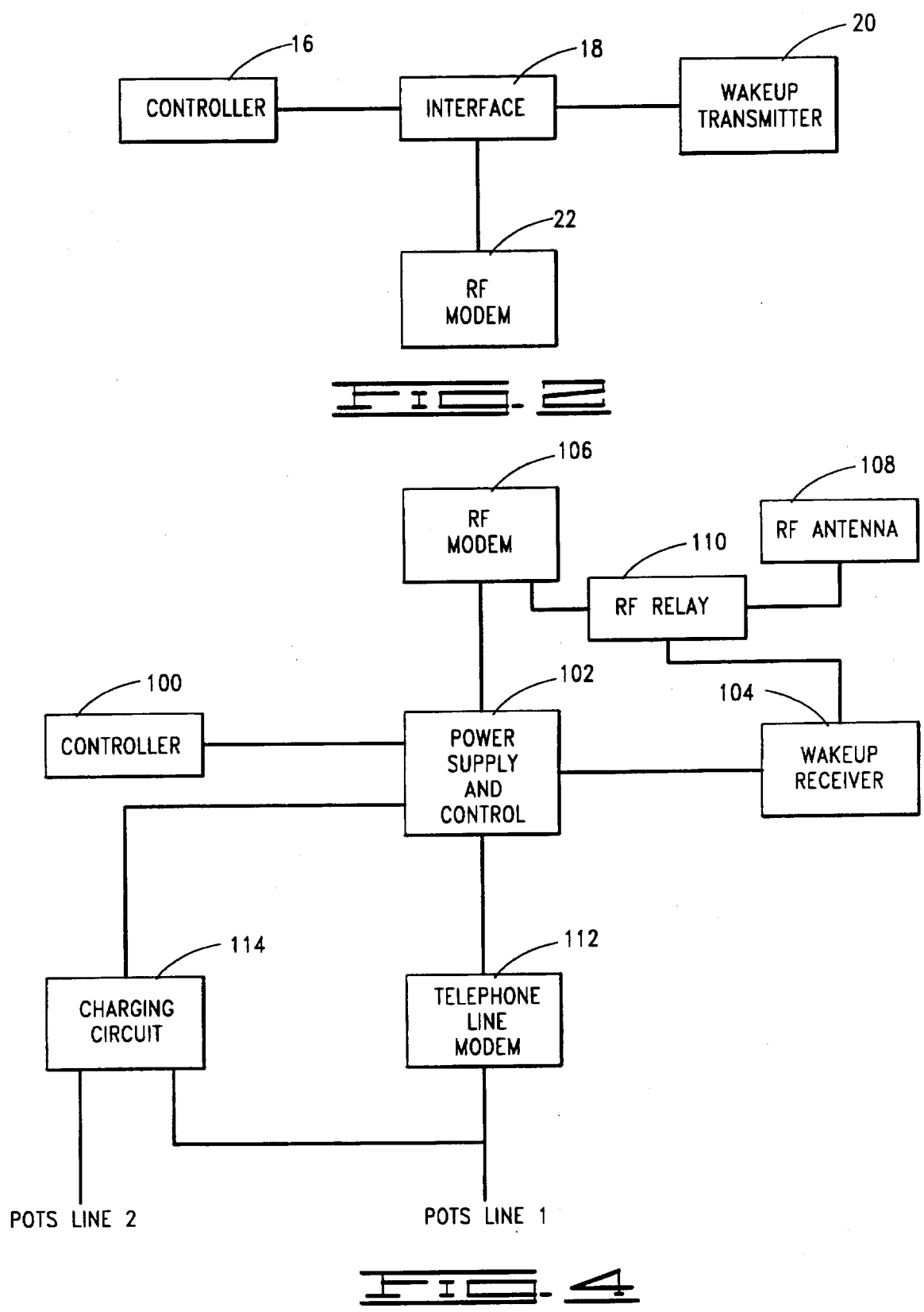

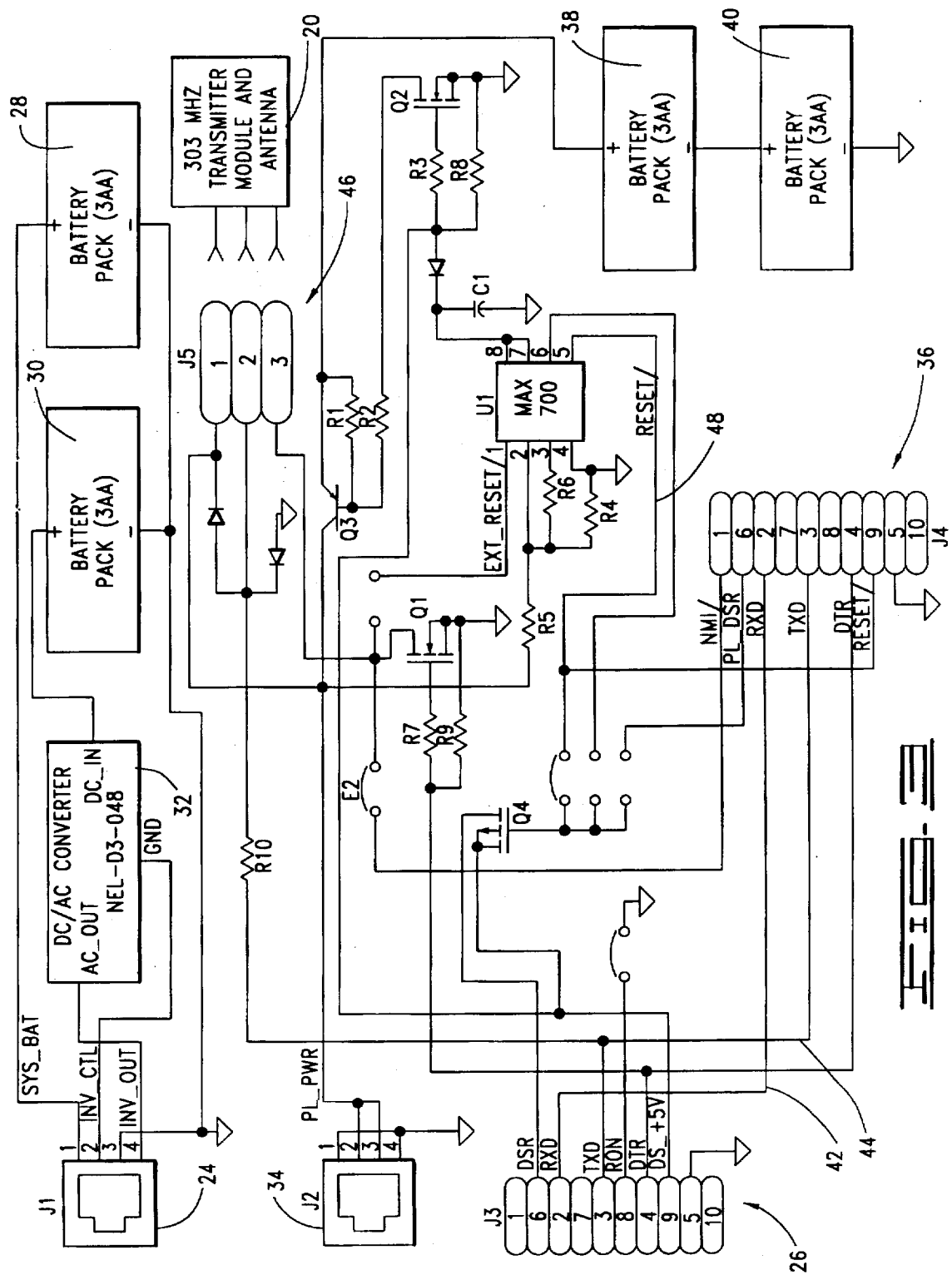

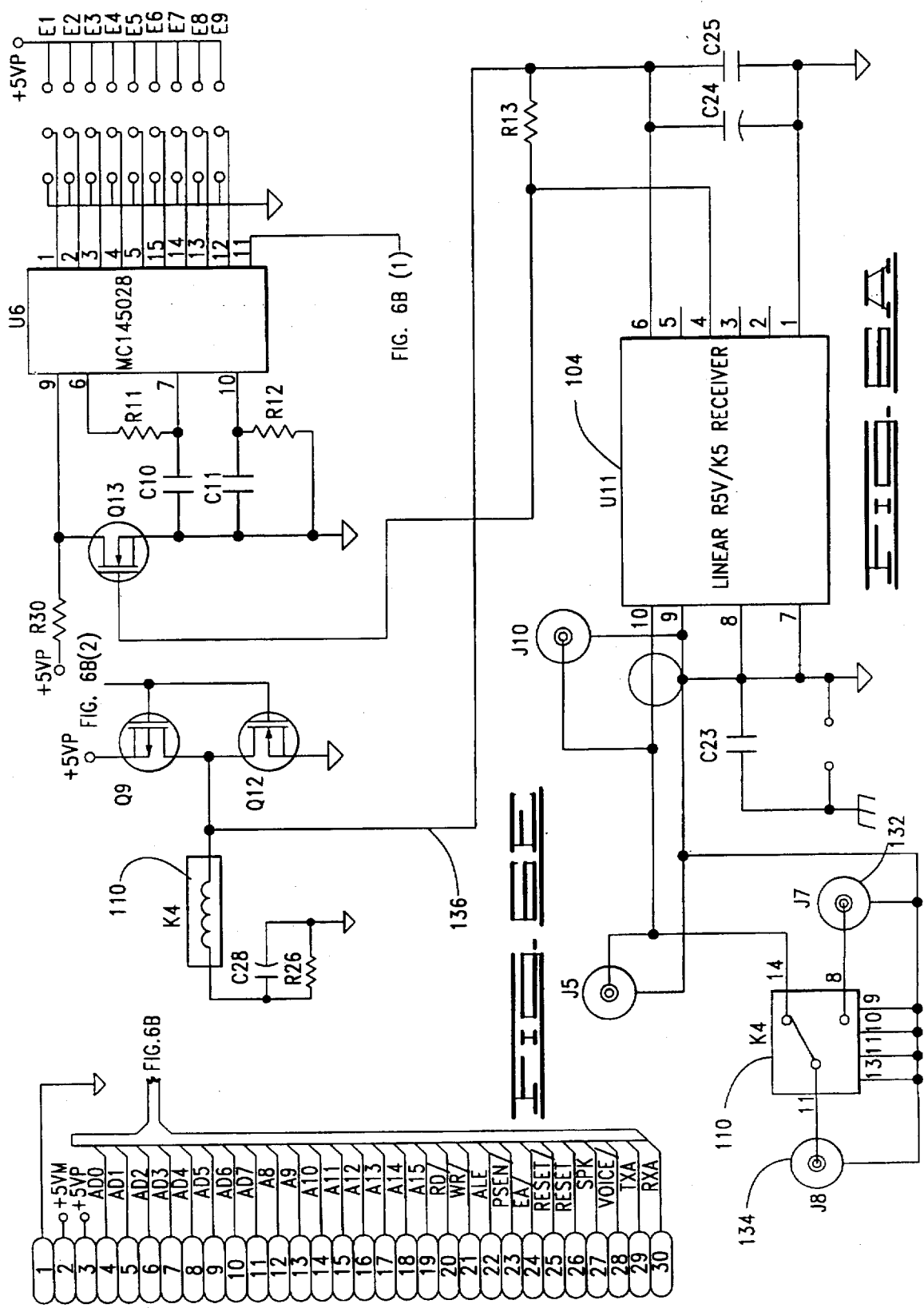

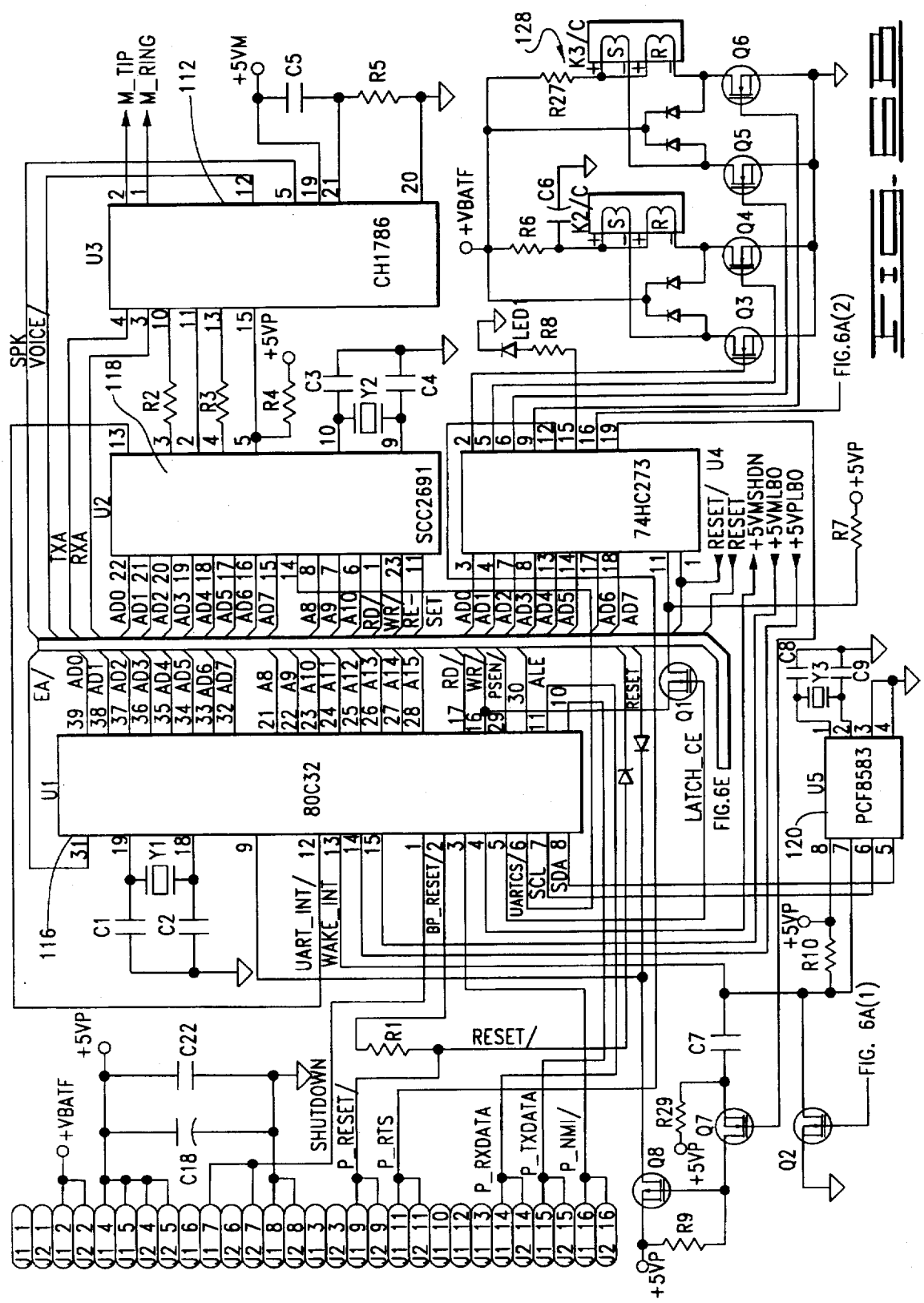

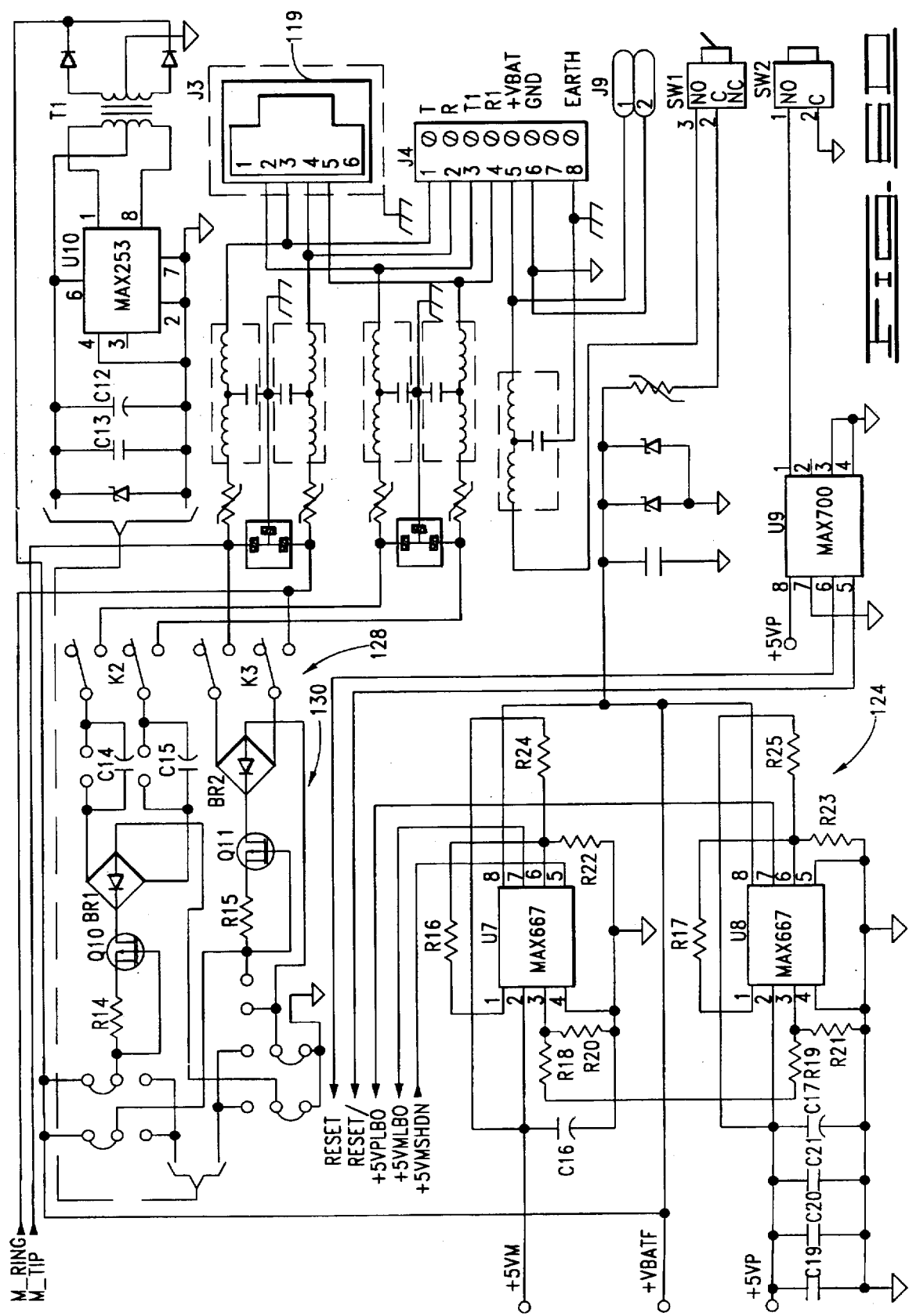

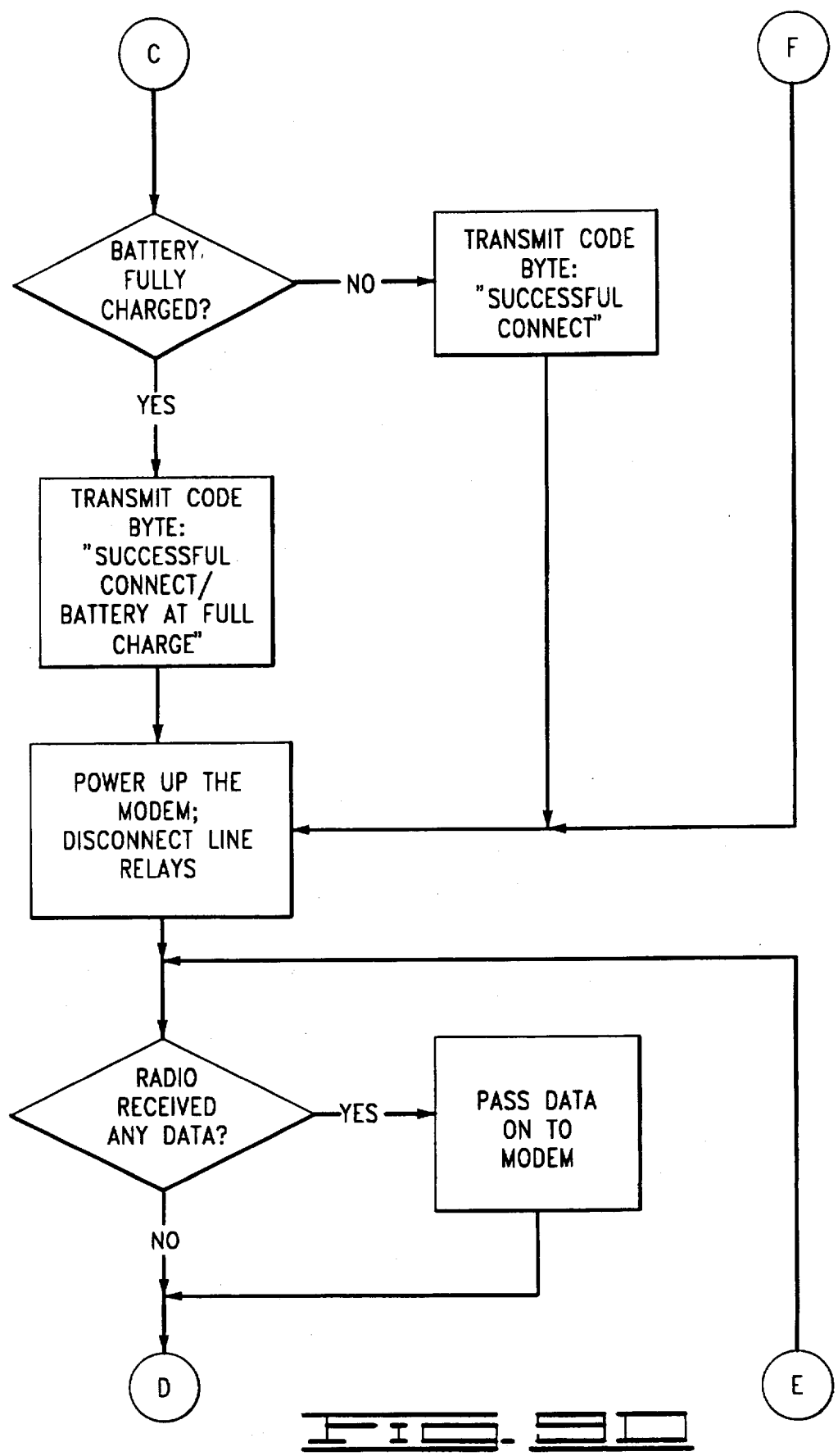

WIRELESS ACCESS TO TELEPHONE NETWORK DIAL TONE

BACKGROUND OF THE INVENTION

This invention relates to systems and methods for enabling a telephone craft technician to access telephone network dial tone, and thereby place a telephone call, without leaving the technician's service vehicle.

In the telephone industry, installation and repair personnel referred to as craft technicians must be in the field traveling from site to site where installations and repairs are to be made. Requests for such services are typically collected at a central location and then dispatched to different technicians for attention. Once a problem has been attended to, the craft technician reports results back to the central location.

The computerization of this dispatching and reporting process has enabled craft technicians to receive dispatches and submit reports without having to travel to and from or verbally communicate with the central maintenance location. For example, a craft technician can now communicate with the central location through hand-held portable field terminals such as are disclosed in U.S. Pat. No. 4,837,811 to Butler et al. and U.S. Pat. No. 5,377,259 to Butler et al. and available from Communications Manufacturing Company (CMC) of Los Angeles, Calif. This computerization of the telephone network maintenance system and the advent of the technician's field terminal have significantly improved the efficiency of the maintenance system.

To communicate with the maintenance system (or any other telephone number desired to be called) through one of the aforementioned field terminals, the craft technician makes a wire connection between the terminal and a conventional, or POTS (Plain Old Telephone Service), telephone line. For example, the technician can plug a modular telephone cable into a jack of the field terminal and into a jack at a subscriber's premises. As another example, the wired connection can be made at a crossconnect box typically located in a residential or commercial neighborhood to provide connecting terminals between the respective central office of the telephone network and the subscribers in the neighborhood. Such a wired connection to the field terminal requires that the craft technician leave his or her vehicle, which is undesirable if the weather is inclement. In some instances, leaving the service vehicle can compromise the technician's safety. Such a wired connection can also result in customer complaints because the technician's connection may be to a subscriber's line. If this occurs and the subscriber attempts to use the line while the technician is accessing it, the line will appear to be not working and thus result in a complaint.

In view of these disadvantages which can arise if a wired connection to the field terminal is required, there is the need for another means for interconnecting the field terminal with the telephone network. One way to satisfy this need is to transmit communications with the field terminal through a cellular phone. It is known that computers can transmit and receive data through cellular phones or other wireless services (e.g., Motorola's ARDIS and Bellsouth/G.E.-Ericson's RAM), and this can be readily done with the aforementioned field terminals from CMC. A disadvantage of this technique, however, is that communications through such a system require payment of a toll for using the system.

In view of the foregoing, there is the continuing need for an improved system and method by which a telephone craft technician can access telephone network dial tone to make a call without having to leave the technician's service vehicle, without affecting customer service or causing customer complaints, and without incurring toll charges for wireless communications.

SUMMARY OF THE INVENTION

The present invention overcomes the above-noted and other shortcomings of the prior art by providing a novel and improved system and method for enabling a telephone craft technician to access telephone network dial tone without having to leave the technician's service vehicle, without affecting customer service or causing customer complaints, and without incurring toll charges for wireless communications.

The system of the present invention comprises a mobile terminal and a crossconnect base station. The mobile terminal includes means for transmitting a radio frequency signal carrying a telephone communication. The crossconnect base station includes means for connecting to a telephone line at a crossconnect box of a telephone network; means for receiving the radio frequency signal carrying a telephone communication; and means for communicating the telephone communication over a telephone line connected to the means for connecting.

The method of the present invention comprises propagating, from a telephone craft technician's service vehicle, a radio frequency communication signal that includes modem commands. Propagation of the signal is to occur when the service vehicle is within a communication range of a selected crossconnect box of a telephone network. The method further comprises receiving, at the selected crossconnect box, the propagated radio frequency communication signal, and in response thereto transferring the modem commands of the communication signal to a modem connected to a telephone line at the crossconnect box so that the modem executes the modem commands to go off-hook, dial, and transmit and receive over the connected telephone line. The method also comprises propagating further radio frequency communication signals between the service vehicle and the crossconnect box for communicating between the service vehicle and the telephone line.

Other aspects of the system and method of the present invention include: (1) providing a wakeup signal from the mobile terminal to the crossconnect base station so that the base station can be powered down when not in use, thereby conserving energy; (2) receiving both the wakeup signal and the primary communication signal (which can carry data and/or voice) through a single antenna connected to the base station at the respective crossconnect box; and (3) recharging one or more batteries in the base station from an energy source of the telephone network. As to this last aspect, a novel and improved method of charging a rechargeable battery from a telephone system is disclosed.

Therefore, from the foregoing, it is a general object of the present invention to provide a novel and improved system and method for enabling a telephone craft technician to access telephone network dial tone without having to leave the technician's service vehicle, without affecting customer service or causing customer complaints, and without incurring toll charges for wireless communications. It is also an object of the present invention to provide a novel and improved method of charging a rechargeable battery from a telephone system. Other and further objects, features and advantages of the present invention will be readily apparent to those skilled in the art when the following description of the preferred embodiments is read in conjunction with the accompanying drawings.

BRIEF DESCRIPTION OF THE DRAWINGS

FIG. 1 is an illustration of an environment in which the present invention for accessing network dial tone can be used, which invention is shown in FIG. 1 to include a mobile terminal and a crossconnect base station.

FIG. 2 is a block diagram of a preferred embodiment of the mobile terminal.

FIG. 4 is a block diagram of a preferred embodiment of the crossconnect base station.

FIGS. 6A–6E are schematic circuit diagrams of an implementation for the block diagram of FIG. 5.

FIGS. 8A–8C show a flow chart of a program for the radio setup and connect module identified in FIG. 7.

FIGS. 9A–9E show a flow chart of a program for the crossconnect base station of FIG. 6.

DETAILED DESCRIPTION OF PREFERRED EMBODIMENTS

Overview

Figure 5:
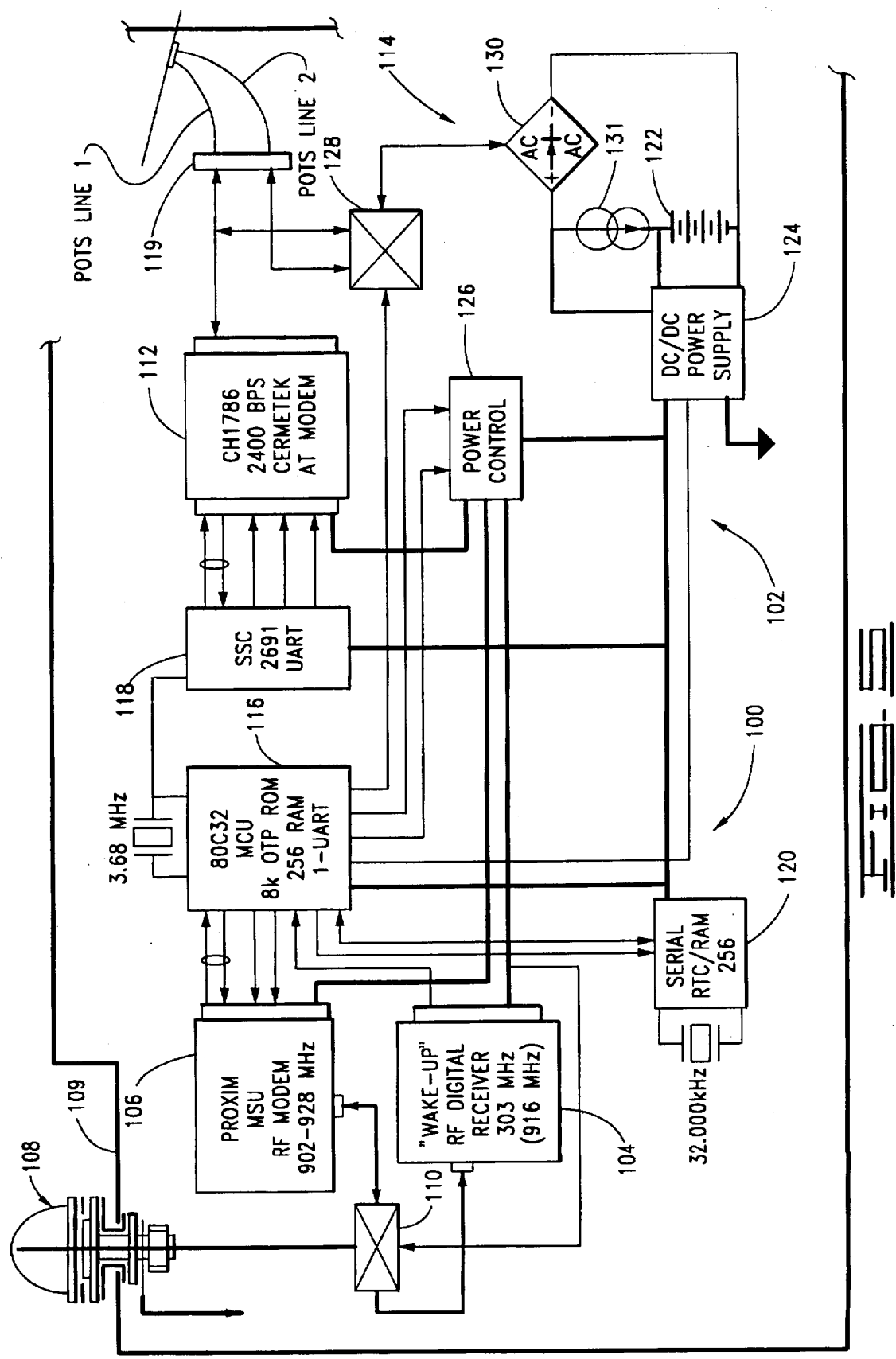
FIG. 5 is a more detailed schematic and block diagram of the preferred embodiment crossconnect base station.
Figure 5C:
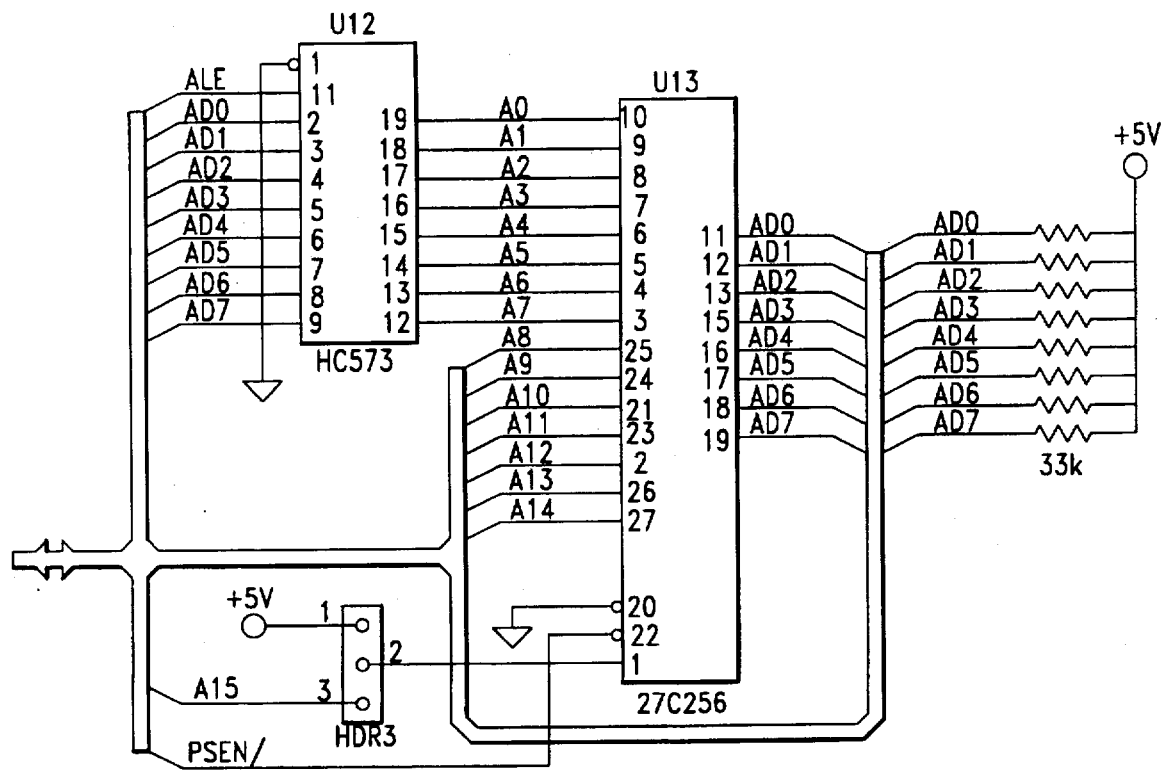
Figure 5C:
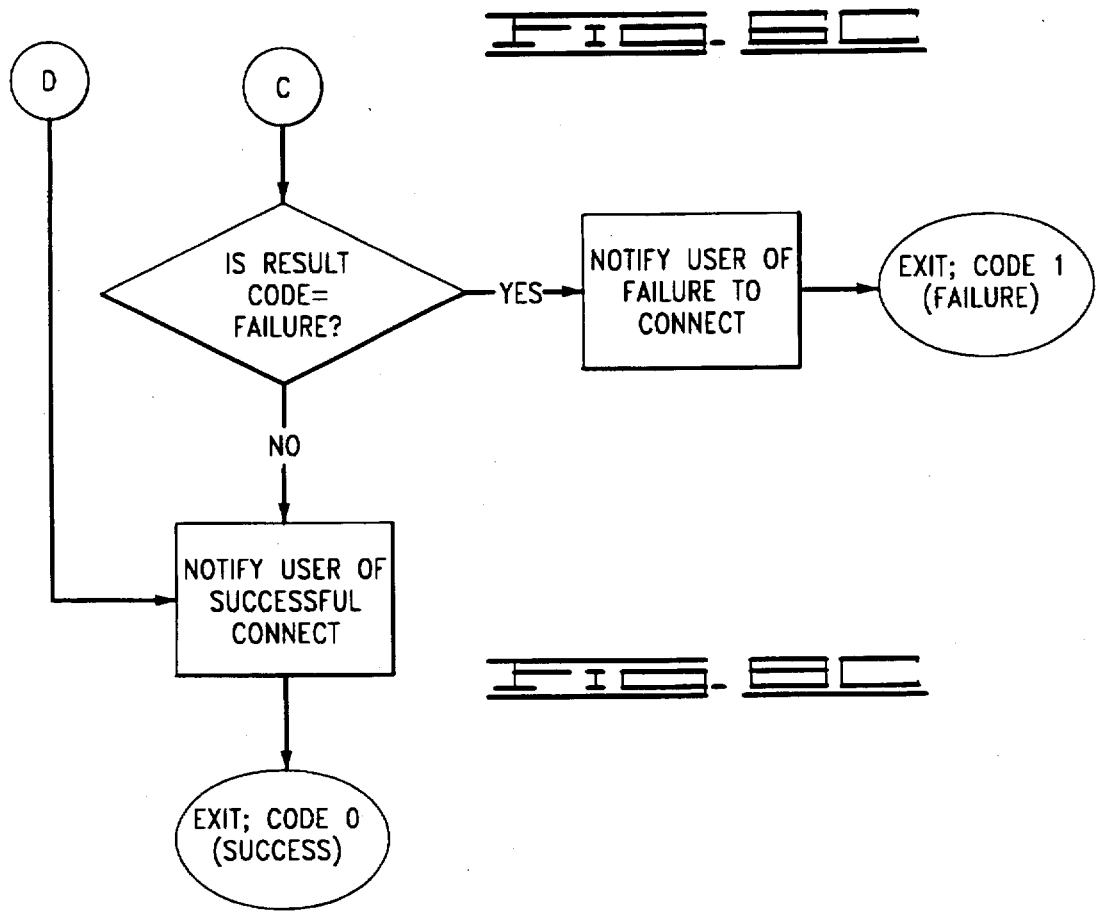

The present invention provides portable data or voice communication terminals with wireless access to telephone network dial tone. The wireless link is provided through radio frequency modems operating in a suitable frequency band, such as one of the unlicensed IS&M (Industrial, Scientific and Medical) bands. Dial tone is accessed through a selected one of a distributed collection of such radio frequency modems installed in crossconnect boxes throughout a given area. Unlike cellular systems, the present invention does not provide for roaming access. That is, a radio frequency link established using the present invention is not passed from one crossconnect location to another. Thus, once dial tone access is established at a particular crossconnect box, the user must remain within the operating proximity of that crossconnect box for the duration of the access.

A particular environment in which the present invention can be used is depicted in FIG. 1. A central office 2 of a telephone network includes switching equipment, signaling equipment and batteries that supply current to operate the telephones of the subscribers served by the central office 2. The central office 2 also includes or communicates with a computerized maintenance system 4. The maintenance system 4 includes a gateway processor which is part of the telephone network and which uses an access protocol such as AT&T's Craft Access System (CAS), Bellcore's Technician Access Network (TAN), CIBS's Force Access System (FAS), or GTE's Automated Work Access System (AWAS). The gateway processor is connected to a telephone line so that it can be accessed by a craft technician calling the telephone number of the gateway processor's line from another telephone line.

Extending from the central office 2 is a feeder network cable 6 which connects to a plurality of crossconnect boxes providing interfaces for a serving area of subscribers. One such crossconnect box is shown in FIG. 1 and identified by the reference numeral 8. Subscriber telephones served by the respective central office 2 are connected to respective crossconnect boxes 8, wherein crossconnects are made between the subscriber's wire pair and a respective pair of wires in the feeder network cable 6. That is, each subscriber telephone line is provided from the central office through a local loop of two wires called a wire pair. A specific wire pair extending from a subscriber connects to a respective wire pair of the feeder network cable 6 at a respective crossconnect box 8. Typically, not all wire pairs of the feeder network cable 6 are used so there are some that merely terminate at the respective crossconnect box. Two of these otherwise unused telephone lines to the central office 2 are used by the preferred embodiment of the present invention as subsequently explained. Each crossconnect box 8 is physically located in the geographical neighborhood of the group of subscribers connected to the feeder network cable 6 through that crossconnect box.

In view of the function and location of the crossconnect boxes 8, they are a convenient place for telephone craft technicians to perform tests on or communicate over telephone lines. This has previously been done by the craft technician driving his or her service vehicle 10 to the location of a particular crossconnect box, parking the vehicle, getting out of the vehicle, and mechanically connecting communication equipment to contacts in the crossconnect box 8. This is no longer necessary with the present invention as the craft technician can merely be within an operating range of the crossconnect box 8 so that he or she does not need to be stationary or out of the service vehicle 10 to link into a telephone line connected to the crossconnect box 8.

To enable this, the present invention provides a mobile terminal 12 and a crossconnect base station 14 depicted in FIG. 1. The mobile terminal 12 is for a telephone craft technician. The terminal 12 is typically mounted in the service vehicle 10, but it is small enough to be hand-portable by the craft technician as well. The purpose of the terminal 12 of the preferred embodiment is to receive maintenance dispatches and to generate and send reports about the maintenance the technician has performed. This receiving and sending occurs over a radio link connecting the mobile terminal 12 to a telephone line of the feeder network cable 6 via the crossconnect base station 14 mounted in the crossconnect box 8. Mobile terminals having other functions can also be used as the inventive aspect of the mobile terminal 12 relates to the radio frequency linkage as opposed to the particular function for which the technician uses it. The preferred embodiment of the mobile terminal 12 will, however, be described with reference to its specific implementation as a craft technician's field terminal through which maintenance jobs are dispatched and maintenance reports sent. The mobile terminal 12 can be adapted to provide voice communications via the present invention.

The crossconnect base station 14 is for connecting to a telephone line of the feeder network cable 6 at the crossconnect box 8. It is mounted in a crossconnect box such that the crossconnect box does not have to be opened to use the base station 14.

Figure 7:
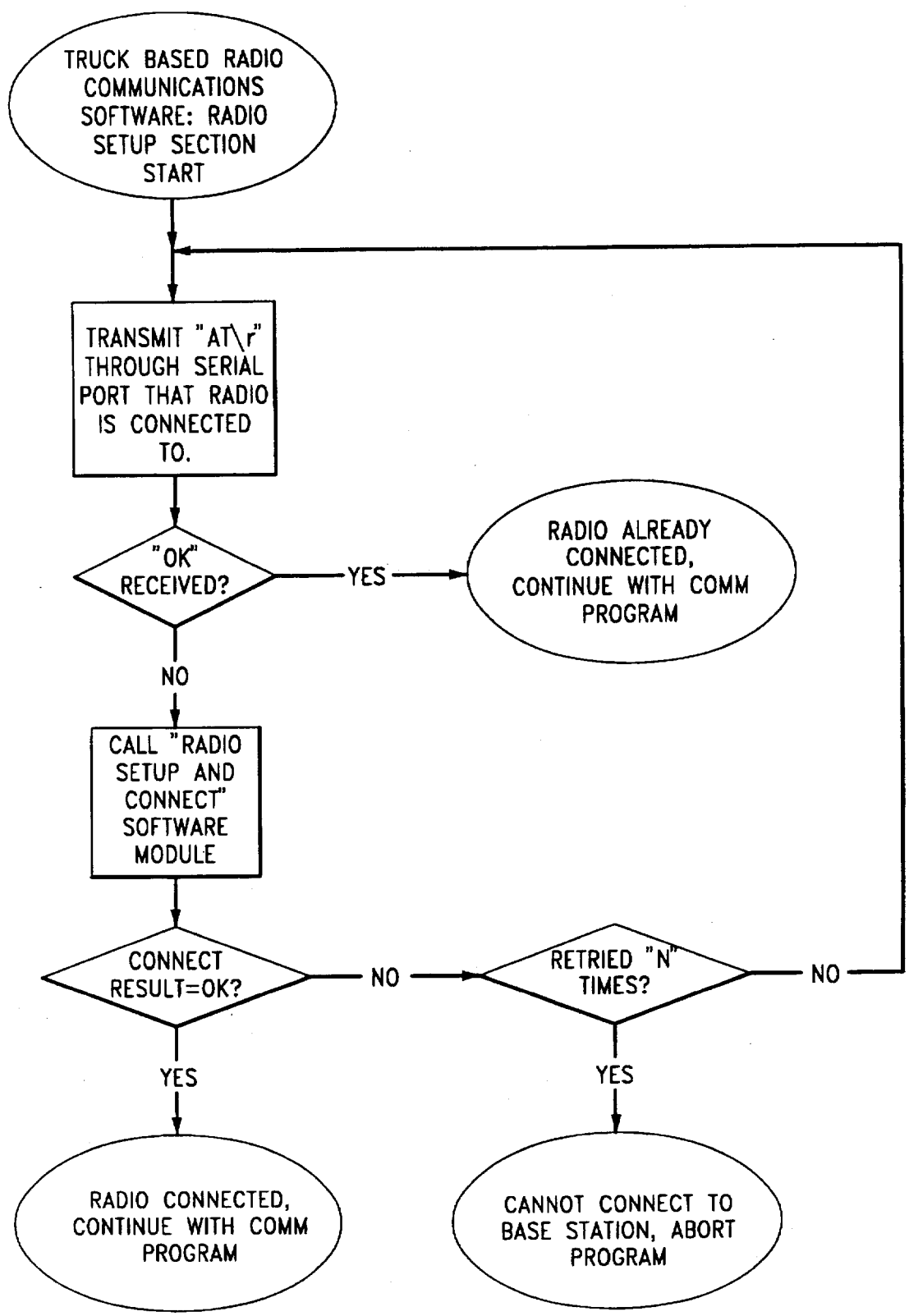
FIG. 7 is a flow chart of a program for a radio setup sequence used in the mobile terminal of FIGS. 2 and 3.
Figure 8A:
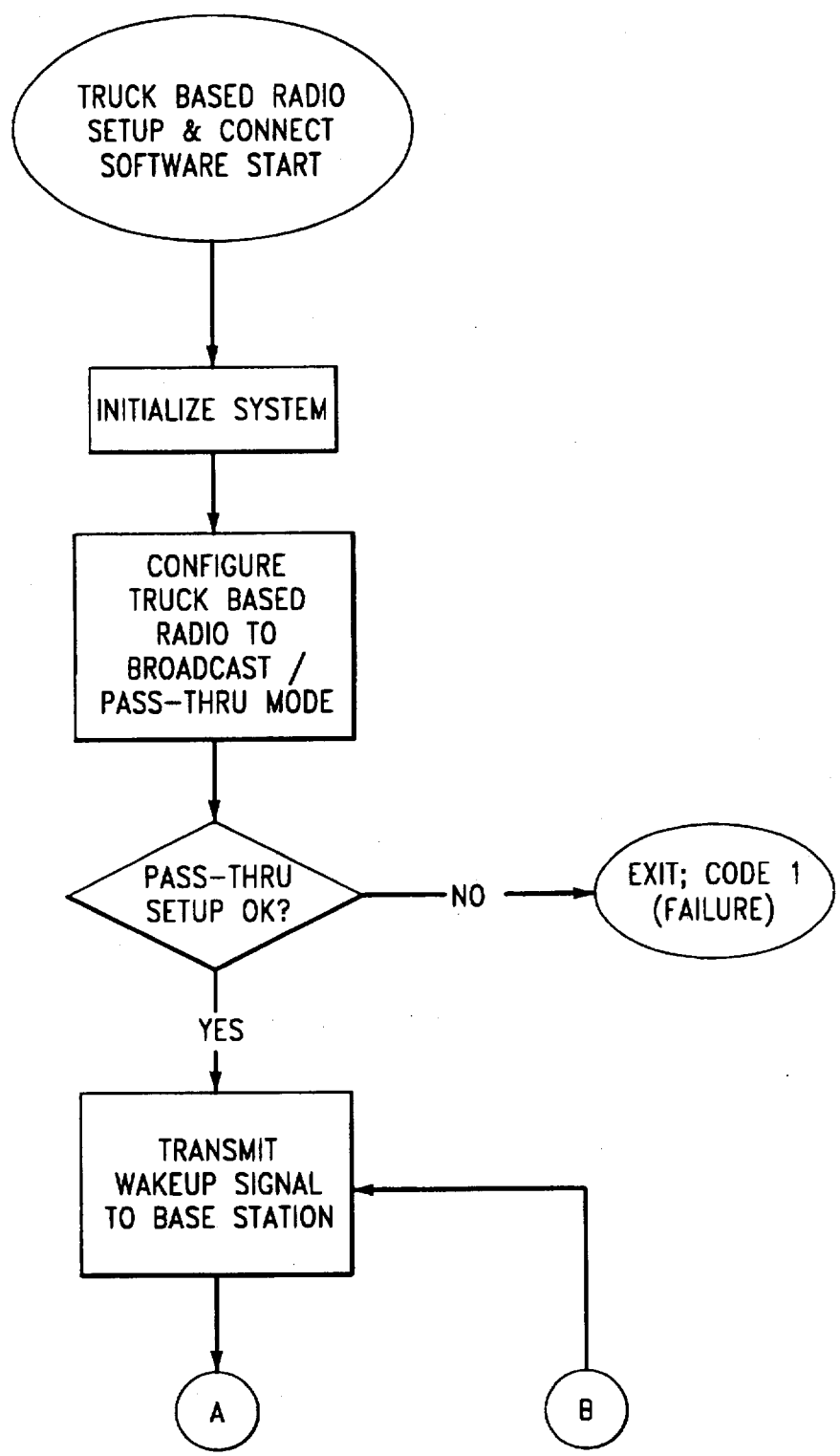
Figure 8B:
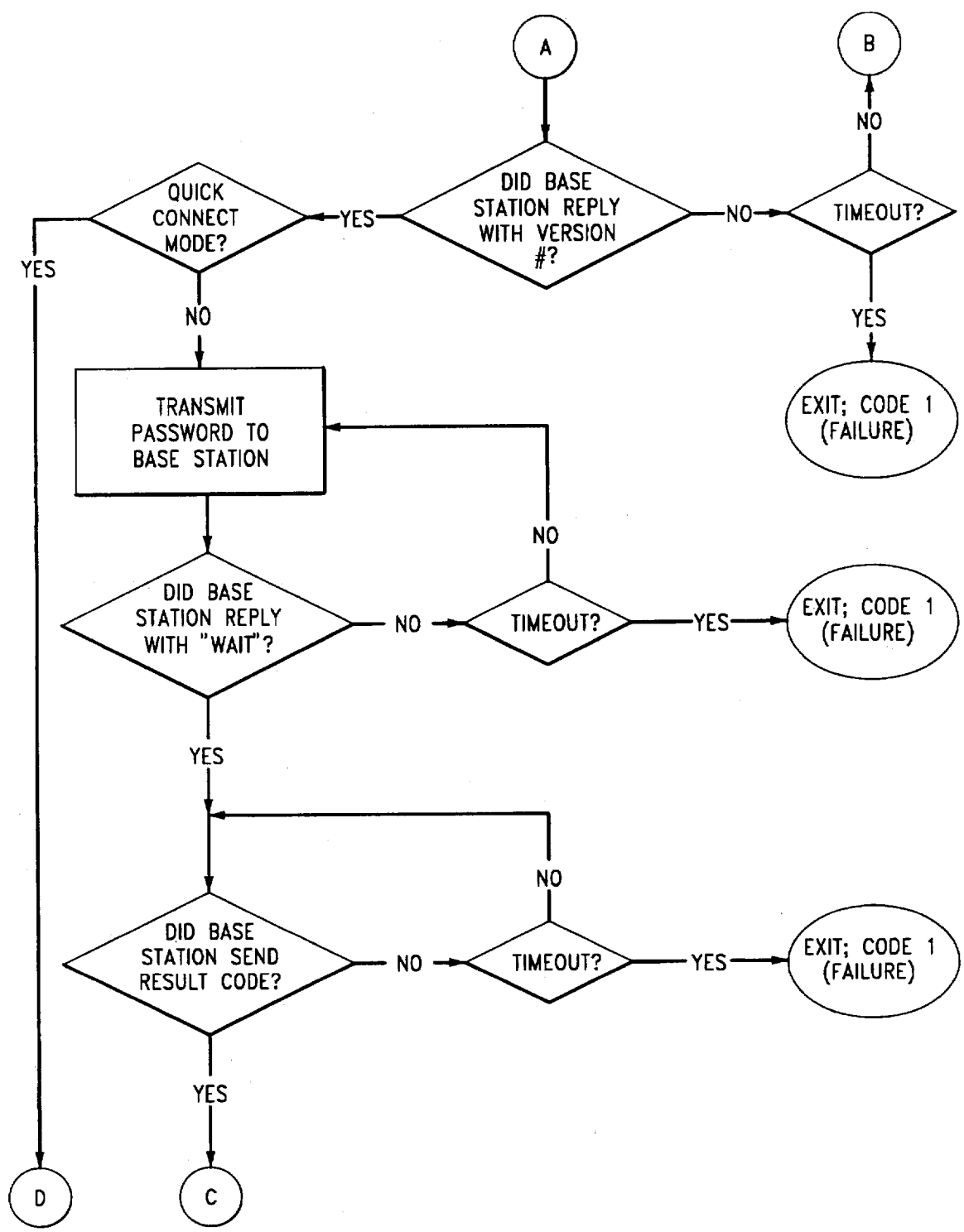
Figure 9B:
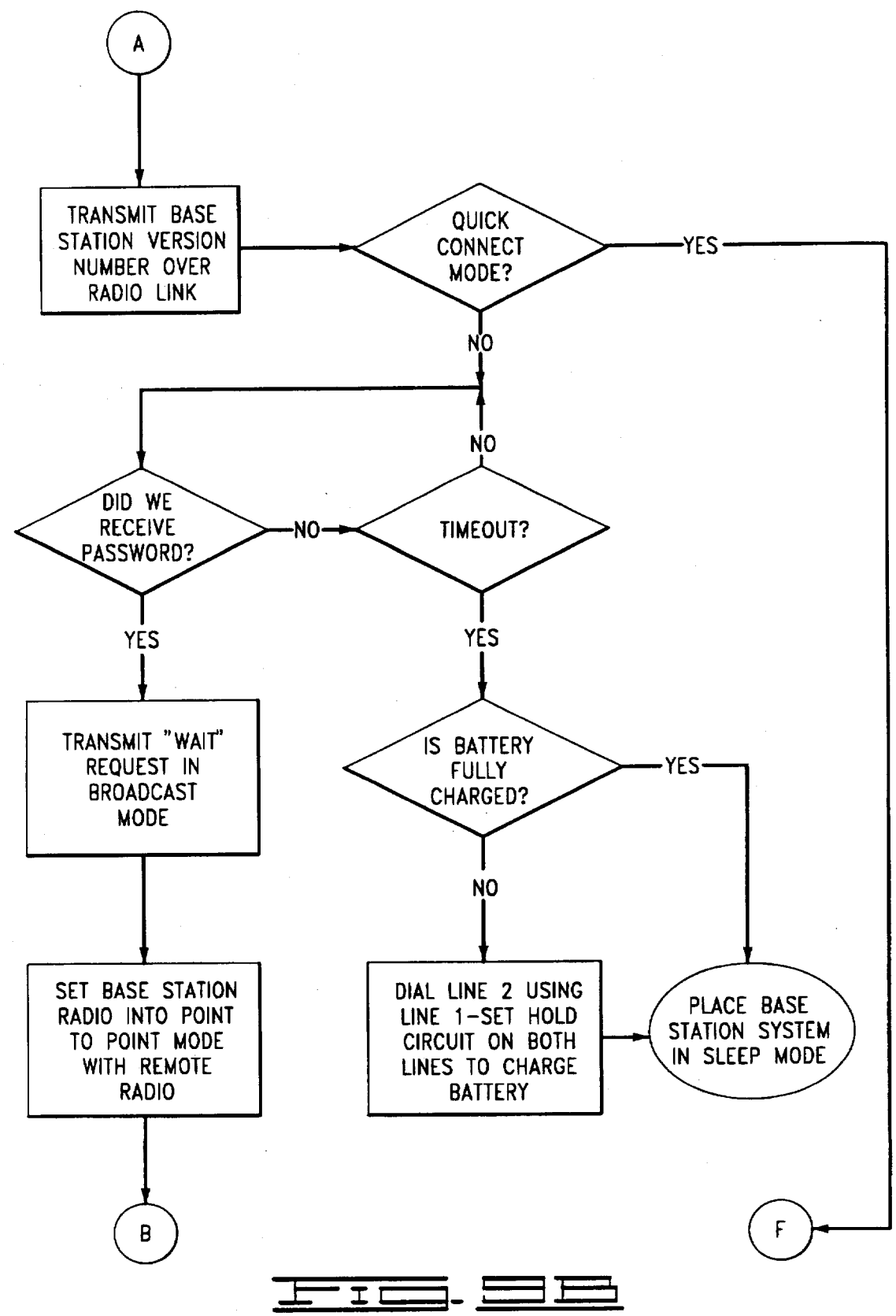
Figure 9C:
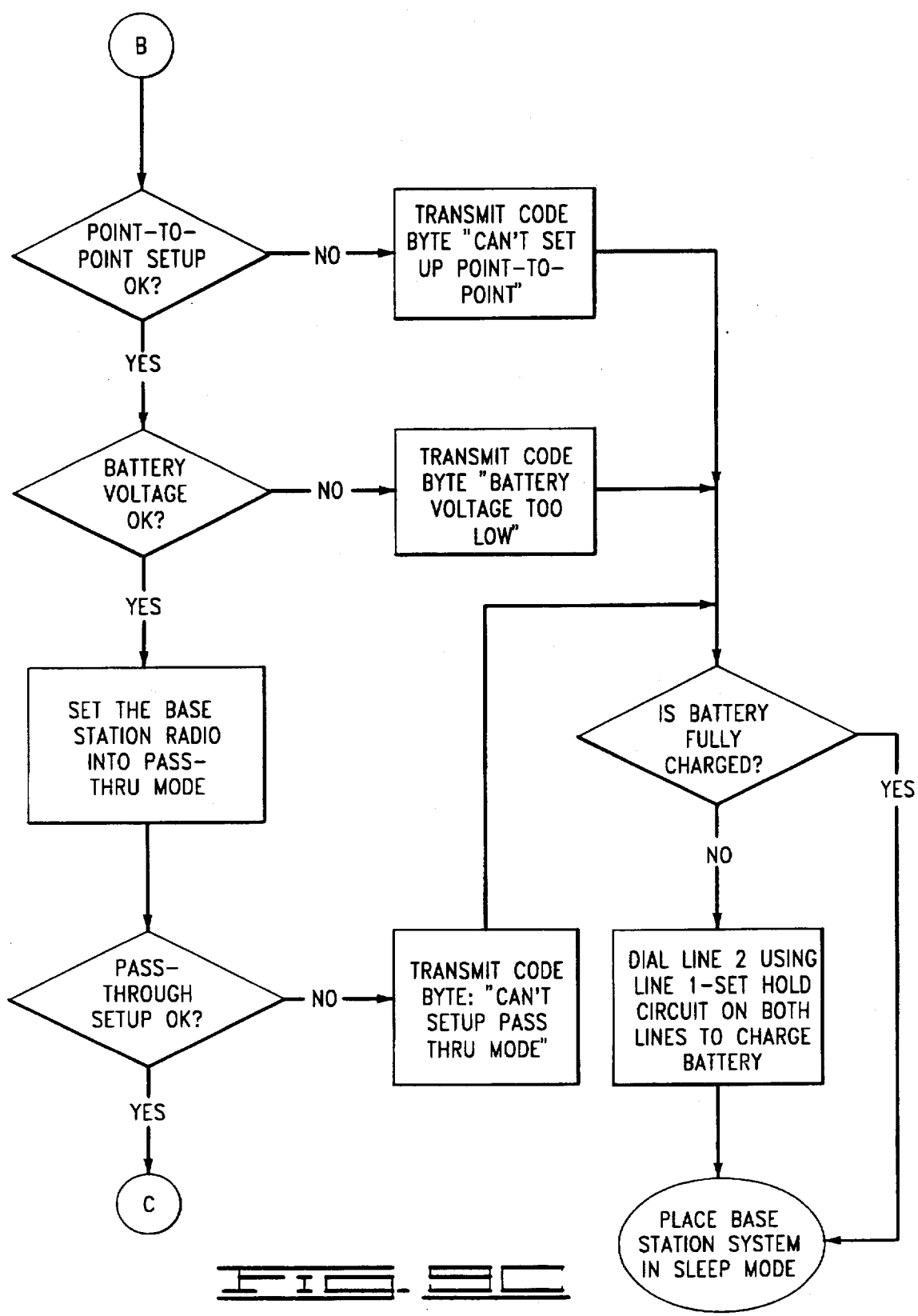
Figure 9E:
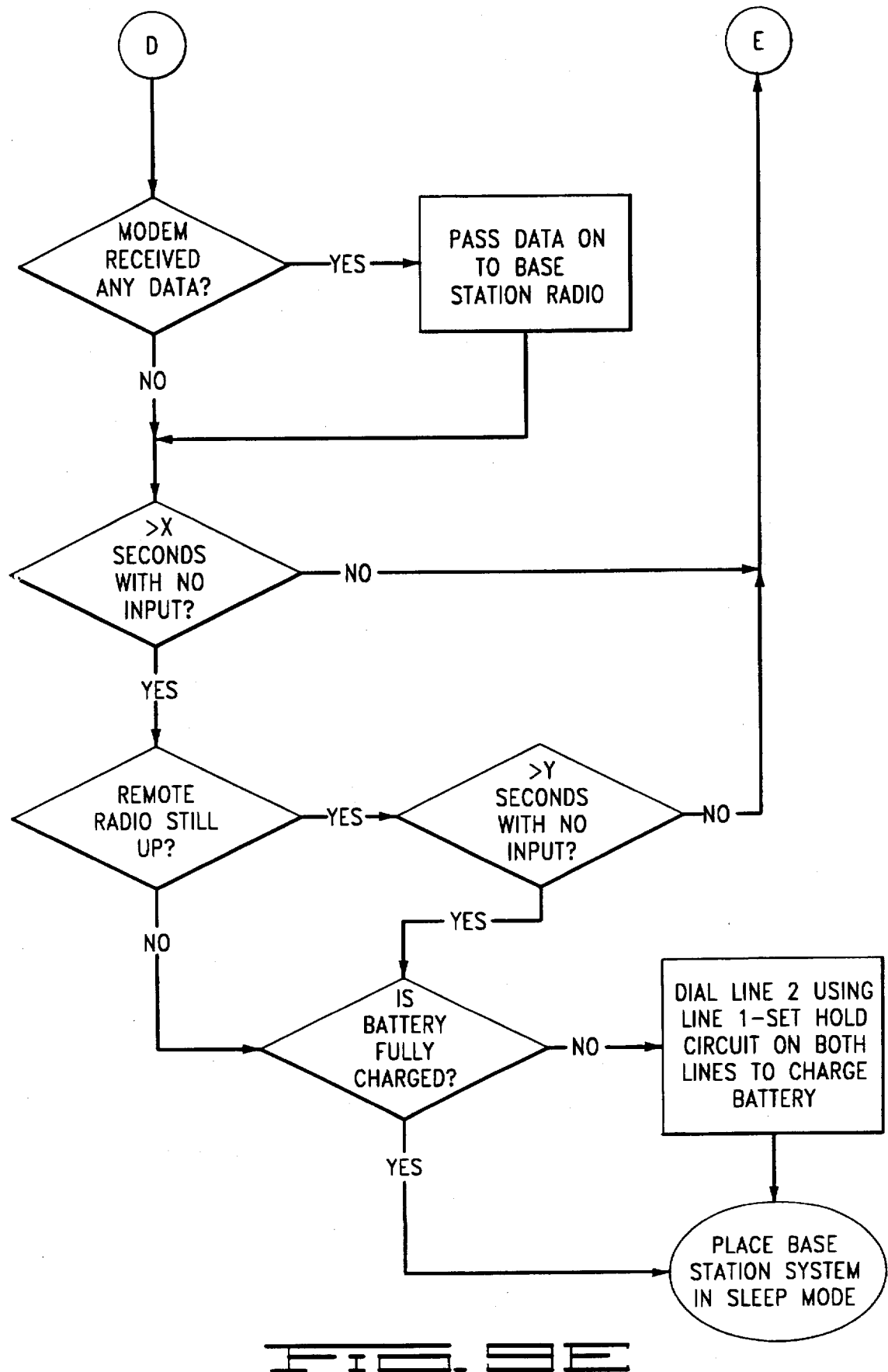

The mobile terminal 12 will be further described with reference to FIGS. 2 and 3. The crossconnect base station 14 will then be described with reference to FIGS. 4–6. FIGS. 7 and 8 show flow charts of programs for the mobile terminal 12, and FIG. 9 shows a flow chart for a program for the crossconnect base station 14. These flow charts will be further described with reference to the method of the present invention.

Mobile Terminal 12

The mobile terminal 12 includes a radio frequency modem to provide the wireless connection with the crossconnect base station 14. The mobile terminal 12 also includes a wakeup transmitter for activating any crossconnect base station 14 within operating distance (e.g., 300 feet) of the wakeup transmitter. Operation and power control of the radio frequency modem and wakeup transmitter are controlled by a programmed controller interfaced to the radio frequency modem and the wakeup transmitter. These components of the mobile terminal 12 are represented in FIG. 2.

The mobile terminal of FIG. 2 includes a controller 16. In a particular implementation, the controller 16 is microprocessor-based and includes an equivalent of the CMC 7910D DataStar® field terminal from Communications Manufacturing Company of Los Angeles, Calif. It is additionally programmed in accordance with the nature of the particular hardware and methodology subsequently described herein and the program depicted in FIGS. 7 and 8. The controller 16 connects to an interface 18 through which the controller 16 connects to and operates a wakeup transmitter 20 and a radio frequency modem 22.

The wakeup transmitter 20 propagates a control signal to energize an in-range crossconnect base station 14. In a particular implementation, the wakeup transmitter 20 includes a 303 megahertz (MHz) transmitter module from RFM Inc., as well as some minimal level translation circuitry.

The radio frequency modem 22 transmits a radio frequency signal carrying a telephone communication which, as mentioned above, can include either data or voice. At least initially, the signal includes suitable command signals. In a particular implementation these include Hayes compatible modem control commands (AT commands). For the illustrated embodiment these commands include Dial, providing the phone number of the maintenance system 4.

In a particular implementation, the radio frequency modem 22 includes a Proxim MSU 900 MHz spread-spectrum radio frequency (RF) transceiver from Proxim, Inc. of Mountain View, Calif. This provides a radio frequency carrier signal within the range of approximately 902 MHz–928 MHz; however, any suitable radio frequency modem operating in any properly authorized frequency range for this function can be used (e.g., it is possible that a frequency reallocation will occur whereby the frequency range of about 2.4 GHz–2.4835 GHz can be used). In the preferred embodiment, one of the aforementioned unlicensed IS&M bands is used. The particularly specified RF modem is a module assembly that can interface via its full-duplex, 19.2 kilobaud, HCMOS-level serial port. The unit includes power management features for portable applications. Utilizing spread spectrum radio, the MSU RF modem provides high-speed RF transmission for 121 kilobyte per second or 242 kilobyte per second aggregate system throughput per channel. Products with communication software can use the pass-through operating mode to replace a wired point-to-point or multi-node network. The unit accepts real-time configuration, status, and message commands as known in the art.

Figure 3A:
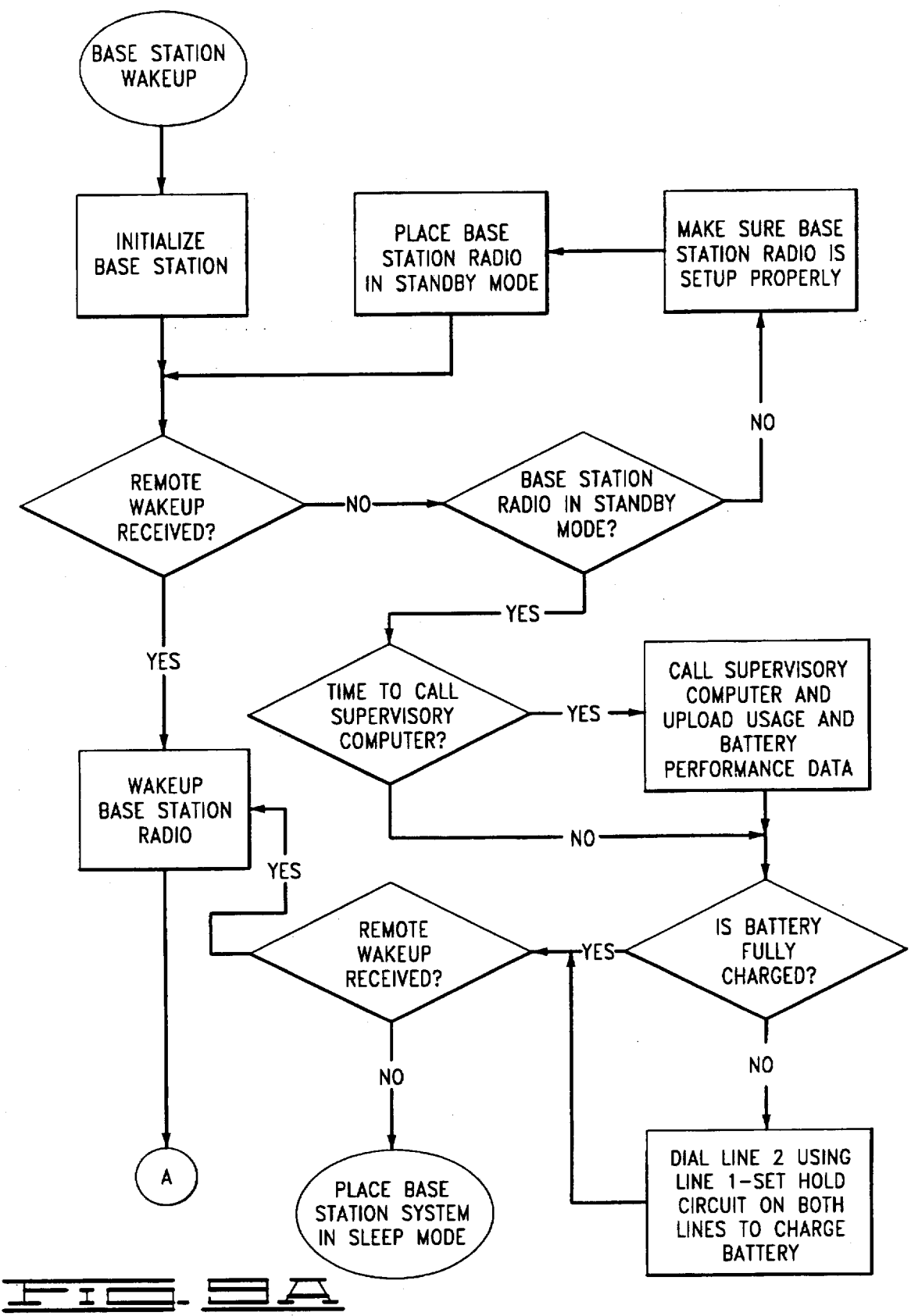
FIG. 3 is a schematic circuit diagram of an implementation of an interface circuit and a wakeup transmitter depicted in FIG. 2.

The known types of controller 16, wakeup transmitter 20, and radio frequency modem 22 referred to above connect to the interface 18, which is shown in a particular implementation in FIG. 3. Referring to FIG. 3, the controller 16 connects through power connector 24 and communication connector 26 of the interface 18. A battery pack 28 of three AA batteries provides system direct current power to the controller 16 through the connector 24, and a battery pack 30 containing three AA batteries provides power to a dc/ac converter 32 providing an alternating current power signal to the controller 16 through the connector 24.

The RF modem 22 connects to the interface 18 of FIG. 3 through a power connector 34 and a communication connector 36. Power is switchably provided from two series connected battery packs 38, 40, each containing three AA batteries.

Data communications from the RF modem 22 to the controller 16 occur via RXD line 42 shown in FIG. 3, and data communications from the controller 16 to the radio frequency modem 22 occur over TXD line 44. The TXD line 44 is also used to communicate with the wakeup transmitter 20 represented in FIG. 3 as connected to the interface 18 via connector 46.

Besides the RXD and TXD communications, the RS-232 port implemented by the connector 26 communicates control signals from the controller 16 via pin 4 ("DTR") of the connector 26. Power and reset status can be monitored by the controller 16 through pin 6 ("DSR") of the connector 26.

When +5V is at pin 9 of connector 26 in response to operation of the controller 16, transistors Q2 and Q3 of FIG. 3 are biased on to supply +6V to the RF modem 22 from batteries 38, 40 through power connector 34. This action also supplies power to a power-on reset circuit, U1 of FIG. 3, causing an active-low reset pulse to be applied via line 48 to the RF modem through pin 9 ("RESET/") of the connector 36. The state of power and reset can be determined by the controller 16 through pin 6 ("DSR") of the connector 26 because the switchable +5V supply (pin 9 of connector 26) is gated to DSR through transistor Q4, which is controlled by the active-low reset. When the reset line 48 goes low, transistor Q4 is biased on passing the state of the switchable +5V on pin 9 of the connector 26.

The DTR signal from pin 4 of the connector 26 performs a dual control function: 1) selection of menu mode for the RF modem 22 and 2) power control to the wakeup transmitter 20. When DTR goes high, transistor Q1 of FIG. 3 is biased on causing the RF modem's NMI line (pin 1 of connector 36) to go low placing it in menu mode. Menu mode is a characteristic of the particular implementation of the RF modem 22 referred to above; this mode allows operating characteristics of the modem to be changed if the controller 16 is so programmed, but it is transparent to the user of the mobile terminal 12 as any such changing of the operating characteristics occurs automatically and thereafter the modem 22 is automatically placed in its normal operating mode by the controller 16 selecting "L" menu option for the particular modem 22.

A high DTR signal also supplies power supply ground to the wakeup transmitter 20. This occurs via the Q1 connection to the connector 46, whereby if the switchable +5V supply is active, power is thereby applied to the transmitter 20 through the completed power supply circuit. With power applied, a coded transmission can be sent from the wakeup transmitter 20 to activate any crossconnect base station 14 within transmission range (approximately 300 feet for the particular implementation described herein). Such a transmission occurs by the controller 16 sending the transmission signal to the transmitter 20 over the TXD line from pin 3 of the connector 26. When a wakeup signal is not to be transmitted, DTR is dropped (returned to low logic level) whereby the power circuit for the transmitter 20 is opened. Subsequent transmissions from the controller 16 through the common TXD port are therefore used only by the RF modem 22 connected to the connector 36.

The foregoing components of this particular implementation can be mounted on one or more printed circuit boards and housed in a suitable case providing keypad and display interface with the craft technician in a manner the same as or equivalent to that of the aforementioned DataStar® field terminal.

Crossconnect Base Station 14

The crossconnect base station 14 of the preferred embodiment includes the components shown in FIG. 4. A controller 100 operates with a power supply and control circuit 102. A wakeup receiver 104 is responsive to the wakeup transmitter 20 of the mobile terminal 12. A radio frequency modem 106 communicates with the RF modem 22 of the mobile terminal 12. In the preferred embodiment, the wakeup receiver 104 and the radio frequency modem 106 share a single antenna 108 through a switch, specifically a radio frequency relay 110. Communications from the RF modem 106 are used by the controller 100 for encoding electrical signals sent over a telephone line modem 112 connected to a POTS telephone line of the feeder network cable 6 shown in FIG. 1. The preferred embodiment of the crossconnect base station 14 also includes a recharging circuit 114 which connects to two POTS telephone lines of the cable 6, one of which lines is also the one connected to the telephone line modem 112. These are non-subscriber lines which become dedicated to the base station 14 when it is connected. Thus, a technician using the present invention will no longer connect into a subscriber line. The preferred embodiments of these components will be more particularly described with reference to FIGS. 5 and 6.

The controller 100 shown in FIG. 5 includes a microprocessor based control unit 116 which also has read only memory, random access memory and a universal asynchronous receiver transmitter. The controller 100 separately includes another universal asynchronous receiver/transmitter 118, a real-time clock/random access memory 120, and additional program storage in the form of erasable programmable read-only memory (EPROM).

The power supply and control circuit 102 of FIG. 4 includes in FIG. 5 a rechargeable battery 122 (e.g., a sealed lead acid +6V battery), a dc/dc power supply circuit 124 and a power control circuit 126.

The wakeup receiver 104 of the preferred embodiment shown in FIG. 5 includes an off-the-shelf 303 MHz digital receiver module from Linear Corp. The wakeup receiver also includes a Motorola MC145028 address decoder chip. Only if the correct address is received twice in a row from the digital receiver module will the Motorola chip signal an address match.

In the FIG. 5 embodiment, the RF modem 106 is implemented by a Proxim MSU RF modem of the same type as used in the above-described particular implementation of the radio frequency modem 22 of the mobile terminal 12.

The antenna 108 is illustrated in FIG. 5 as a vandal-proof 900 MHz antenna mounted inside a weatherized enclosure to the outer cabinet 109 of the crossconnect box 8. It is selectably connectable to either the receiver 104 or the RF modem 106 through the radio frequency relay 110.

The telephone line modem 112 of the preferred embodiment can be any POTS-type modem having a standard technology (e.g., 28.8k V.34). The particular implementation shown in FIG. 5 is a Federal Communication Commission (FCC) registered Hayes compatible modem having EEPROM; however, other POTS-type modems can be used. As shown in FIG. 5, the modem 112 mechanically connects to a conventional POTS telephone line through a suitable connector 119 of the crossconnect base station 14.

Still referring to FIG. 5, the recharging circuit 114 is shown to include battery charger relays 128. One relay connects the telephone line connected to the modem 112 to a respective rectifier bridge, and another relay connects a second conventional POTS telephone line at the crossconnect box 8 to a respective rectifier bridge. Both rectifier bridges are represented in FIG. 5 by the reference numeral 130. This provides direct current for recharging the battery 122. The current is maintained through a constant current source 131 (implemented with a depletion mode field effect transistor) at a set charging current even with varying line voltage. As will be explained in more detail below, the recharging circuit conducts recharging current to the battery from the telephone network.

The components shown in FIG. 5 are housed in an enclosure shielded against electromagnetic interference and adapted to mount in the cabinet 109 of the crossconnect box 8.

More particular implementations of the elements shown in FIG. 5 will be described with reference to FIG. 6. Values of resistors and capacitors for the particular implementation are listed in this specification prior to the claims; however, these are not limiting of the invention.

In FIG. 6A, the antenna 108 provides RF input to both the wakeup receiver 104 and the RF modem 106 (not shown in FIG. 6A but connected to coaxial connector 132). The antenna 108 connects via coaxial connector 134 to RF relay 110 (K4) which switches between the two devices. K4 is controlled by the controller 100 through control latch U4 (FIG. 6B), pin 16, and transistors, specifically field-effect transistors (FETs), Q9 and Q12 (FIG. 6A). When U4, pin 16 is low, Q9 is enabled thereby applying +5V to the positive side of K4's coil. Current will flow through the coil, setting the relay, until capacitor C28, which is tied to the negative side of K4's coil, is fully charged. When U4, pin 16 is high, Q12 is enabled applying a ground to the positive side of K4's coil. K4 is then reset by the discharge of the stored energy from C28. Setting K4, which connects the antenna to the input of the wakeup receiver, also supplies power to the wakeup receiver 104 via Q9 and connection 136 shown in FIG. 6A. Resetting K4, which connects the antenna to the input of the RF modem, also removes power from the wakeup receiver via Q12 and connection 136.

Still referring to FIG. 6A, the process of establishing a wireless link is initiated when the wakeup receiver 104, U11, receives a signal encoded with a unique address. This assumes K4 is set, routing the antenna and power to the wakeup receiver. Demodulated data is output from U11, pin 4, through FET Q13, which acts as an inverter, and into an address decoder, U6, pin 9. A valid transmission wakeup pulse is generated when the correct address is received (specifically in the illustrated embodiment, this occurs only when two correctly encoded addresses in a row are received). The decoder comparator address of U6 is set with jumpers E1–E9. It is a tri-state comparator, therefore there are three states per jumper: pulled up, pulled down and open. The output of the address decoder U6 is routed to the processor's interrupt input pin 13 (U1 in FIG. 6B), through FET Q2 (FIG. 6B) which acts as an inverter as well as an open collector output. The inverted valid transmission pulse can also provide a reset through FETs Q7 and Q8 (FIG. 6B). The pulse is gated by Q7 which is controlled by control latch U4, pin 19. The processor sets pin 19 of U4 prior to going into sleep mode so that a valid transmission will provide a reset. The pulse is inverted by Q8 to satisfy the processor's reset input polarity. The interrupt and reset capabilities of the wakeup receiver 104 (U11) are wire ANDed with the interrupt output of the real-time clock circuit 120 (pin 7, U5 in FIG. 6B).

In FIG. 6B, a particular implementation of the controller 100 is shown as including an 80C32 microprocessor, U1. The processor monitors for wireless link activation requests, handles the programming of the RF modem, establishes and terminates the wireless link, provides data buffering, monitors battery status, and controls and schedules battery charging.

The controller 100 also includes the octal latch U4. The latch U4 provides processor control of all relays, the RTS input of the RF modem 106, the light emitting diode LED1, and the processor wakeup reset (described above with regard to Q7 and Q8). Data is clocked into the latch U4 by the processor WR/line, U1, pin 16. The clock input of U4 is gated through FET Q1, which is controlled by the processor I/O line P1-4, U1, pin 5.

The controller 100 also includes chip U5 which specifically implements the combination real-time clock (RTC) and 256 byte random access memory (RAM) device 120 of FIG. 5. Control and data access are performed over a two-wire I²C serial bus interface.

The RTC of U5 is used as a programmable countdown timer which generates an interrupt or processor reset at a predetermined time. The interrupt output of the RTC, pin 7 of U5, is routed to the processor's interrupt input INT1, pin 13. The RTC interrupt can also provide a processor reset through FETs Q7 and Q8. The interrupt is gated by Q7 which is controlled by control latch U4, pin 19. The processor sets pin 19 of U4 prior to going into sleep mode so that an interrupt from the RTC will provide a reset signal. The signal through Q7 is inverted by Q8 to satisfy the processor reset input polarity.

The RAM of U5 is used for the storage of the RF modem setup parameters and statistical data. The RF modem setup parameters are working copies of the parameters stored in the nonvolatile EEPROM of the 2400 baud modem U3 (FIG. 6B) implementing the telephone line modem 112 of FIG. 5.

Still referring to FIG. 6B, power and control connections are provided to the RF modem 106 through either J1 or J2, depending on the particular mechanical implementation of the interface. Electrically, J1 and J2 are equivalent. Control of the RF modem 106 is performed by the processor U1 and data buffering is handled through the processor's internal UART.

The RF modem 106 is programmed by placing it in menu mode. This is accomplished by momentarily toggling the NMI/input, J1 and J2, pin 16, from high to low. The NMI/input is controlled by the processor I/O line, P1-2, pin 3 of U1 in FIG. 6B.

The RF modem 106 can be placed in a low power standby mode under software control. There is both a software and a hardware acknowledgment of this state. The hardware acknowledgement is indicated by an active high on J1 and J2, pin 7, which output is tied to the processor I/O line, P1-0, pin 1 of U1. The software acknowledgement is in the form of an ACK packet sent by the RF modem right after the standby packet is issued by the processor.

The RF modem 106 can be awakened from standby mode by asserting a momentary high on J1 and J2, pin 11 (RTS). The wakeup input is controlled by the control latch, U4, pin 12 under control from the processor U1.

A low-level hardware reset can be performed on the RF modem 106 by pulling J1 and J2, pin 9 low. This input is controlled from both the reset circuit, U9, pin 5 (FIG. 6D) and by the processor I/O line, P1-1, pin 2 of U1 (FIG. 6B).

The full bi-directional data path in the crossconnect base station 14 is from the RF modem (J1 and J2, pins 14 and 15) through the processor's integrated UART of chip U1 to the external UART 118 (U2, FIG. 6B) and finally through the integrated 2400 baud modem 112 (U3, FIG. 6B) to the connected telephone line (POTS line 1 in FIG. 5).

The UART 118 (U2, FIG. 6B) is read/write enabled from the processor I/O line P1-5, pin 6 of U1. The UART 118 interrupt output (U2, pin 13) is tied to the processor's interrupt input pin 12 of U1.

Modem instructions pass through the UART 118 from the processor in the form of standard Hayes AT commands. The integrated 2400 baud modem 112 is independently powered from regulator U7 (FIG. 6D). Power to the integrated modem is controlled by the processor I/O line P1-3, pin 4 of U1. Additionally, the modem 112 contains nonvolatile EEPROM which is used for the storage of the RF modem setup parameters. The nonvolatile storage of these parameters is redundant to the RTC/RAM device, U5, mentioned above.

In FIG. 6C, an address latch U12 and an EPROM U13 are shown. The EPROM U13 provides additional program storage space beyond that which is integrated within the control unit 116 (U1, FIG. 6B).

The battery recharging circuit 114 will next be described. Battery charging power is derived from respective energy sources of the telephone system connected to the two dedicated telephone lines shown connected through connector 119 in FIG. 5. While idle, the crossconnect base station 14 periodically calls the second telephone line (POTS line 2) from the first telephone line (POTS line 1) through the telephone line modem U3 (FIG. 6B) which is hard-wired to the first telephone line through the M_TIP and M_RING lines designated in FIGS. 6B and 6D. In FIG. 6D, these two telephone lines are connected through connector J3, which thus implements connector 119 of FIG. 5. After the call from line 1 to line 2 is placed, relays K3 (line 1) and K2 (line 2) shown in FIG. 6D are closed, thereby establishing electrically parallel-connected polarized constant current circuits including, for POTS line 1, BR2, Q11, R15, and for POTS line 2, BR1, Q10, R14, shown in FIG. 6D. These circuits are energized by the respective telephone system batteries connected to telephone lines 1 and 2. Battery charger relays 128 (FIGS. 6B and 6D, which include relays K2 and K3) are controlled by Q3, Q4, Q5, Q6 shown in FIG. 6B, which are controlled by processor U1 through latch U4 also shown in FIG. 6B. Q3 is controlled by U4 pin 2, Q4 by U4 pin 5, Q5 by U4 pin 6, and Q6 by U4 pin 9. Any of these U4 control lines going high activates the corresponding device. Activating Q3 sets K2, thereby "answering" the call placed through telephone line 1 and connecting telephone line 2 to the charging circuit. Activating Q4 resets K2. Activating Q5 sets K3, thereby connecting telephone line 1 to the charging circuit. Activating Q6 resets K3. Relay K2 is activated to go off-hook a set time period (e.g. ten seconds) after the call is placed to allow for the call to go through and ring telephone line 2; too early of an activation would result in line 2 being "busy". Relay K3 is activated to hold the line after this has occurred via the modem U3, after which transition of K3 the modem U3 can be operated in a power conserving quiescent or powered down mode. At this time the RF modem 106 is placed in standby and the processor U1 is placed in sleep mode. The wakeup receiver remains active, awaiting a wakeup signal.

Another charging technique is to place a call from line 1 to line 2 as mentioned above but to leave relay K2 in its on-hook mode (the reset position shown in FIG. 6D). As in the previous technique, calling line 2 causes an alternating current ring current to be generated, but in the present technique the ringing is maintained by holding line 1 and not switching relay K2 off-hook so that ringing continues until disconnected by the telephone company system (e.g., a 120-volt, 20 hertz ring signal is generated for approximately four minutes before the telephone system automatically stops it). This current is rectified by bridge BR2 to provide battery charging current after relay K3 is switched to its off-hook mode.

Battery power is manually switched through SW1, the master power on/off switch shown in FIG. 6D. Current and voltage protection are provided by the fuse and diodes shown in FIG. 6D connected to switch SW1.

Regulator U8 shown in FIG. 6D, and its associated circuitry, provide system power to all base station 14 circuits with the exception of the telephone line modem 112 (U3 in FIG. 6B). Regulator U8 also provides over-voltage monitoring of the battery charge voltage. The over-voltage signal from U8, pin 7 is tied to the processor's T0 input (U1, pin 14 in FIG. 6B). Regulator U7 and its associated circuitry provide power to the telephone line modem 112 as described above. Regulator U7 also provides low-voltage monitoring of the battery. The low-voltage signal from U7, pin 7 is tied to the processor's T1 input (U1, pin 15 in FIG. 6B). still further in FIG. 6D, reset chip U9 generates a precision debounced 250 millisecond reset signal when manual reset switch SW2 is depressed or when power is initially applied to the system. An active high reset is presented at U9, pin 6 and is routed to the processor, U1, pin 9, and to the UART, U2, pin 11 (FIG. 6B). An active low reset is presented at U9, pin 5 (FIG. 6D) and is routed to the control latch, U4, pin 1 (FIG. 6B) and to the RF modem 106 through J1, pin 9 and J2, pin 9 (FIG. 6B).

In FIG. 6E, connector J6 provides a concentration of all vital power, control and analog signals in the crossconnect base station 14 for expansion purposes.

In the base station 14, there are three levels of power control:

(1) The +5VMSHDN line (FIGS. 6B and 6D) from the microprocessor controls the power applied to the modem 112. If +5VMSHDN is active (high), power to the modem module 112 is turned off.

(2) The RF radio 106 can be placed in a low power standby mode via a software command from the processor.

(3) The processor itself can be placed into a very low power sleep mode, to be awakened only by an interrupt or a reset.

POWER MODES FOR DIFFERENT OPERATING STATES

| Operating State | Wakeup Receiver | Processor | RF Radio | Modem |
| --- | --- | --- | --- | --- |
| Dial for charge | active | active | standby | active |
| Charge | active | sleep | standby | off |
| Wakeup | off | active | active | off |
| Connect | off | active | active | on |

Method

To use the system described above in the environment depicted in FIG. 1, the craft technician drives the service vehicle 10 within range of a crossconnect box 8 containing a crossconnect base station 14. In the particular implementation, the operating range is approximately 300 feet.

When within range, the technician runs the maintenance application program used in the DataStar® implemented portion of the mobile terminal 12 for communicating with the maintenance system 4 (e.g., a TAN or CAS compatible application program). This is performed in a conventional manner but modified to query the technician as to whether radio frequency access is to be used. In this case, such access is to be obtained so the technician responds "yes". Upon receiving a yes response, the mobile terminal 12 begins a wireless access connect sequence of the present invention described below. Once connected through this sequence, the wireless link is transparent to the user. During idle periods when the foregoing is not occurring, the battery charging circuitry in the crossconnect base station 14 periodically charges the battery from the connected POTS lines.

The wireless access connect sequence commences with the mobile terminal 12 sending a modem command to check if the crossconnect base station 14 is already up. The modem command of the preferred embodiment is "AT\r". If the system is already up, "OK" is transmitted from the crossconnect base station 14 to the mobile terminal 12.

Upon receiving "OK", the mobile terminal 12 continues with the communication program. If "OK" is not returned, the mobile terminal 12 sends a wakeup signal from the wakeup transmitter 20 to initiate connection. This occurs by propagating, from the telephone craft technician's service vehicle, a radio frequency wakeup signal when the service vehicle is within the communication range of the selected crossconnect box. In response to receiving the wakeup signal, the crossconnect base station 14 powers up, sends its serial or version number to the mobile terminal 12 via the RF modem 106, and waits for the password from the mobile terminal 12.

Once the serial or version number is received by the mobile terminal 12, it sends a password using its RF modem 22. This also transmits the local radio's serial number.

If the password is accepted at the crossconnect base station 14, the base station 14 sends a wait request through the RF modem 106 and configures itself.

When a wait ("W") is received by the mobile terminal 12 through the RF modem 22, it waits for a connection result, which follows in about ten seconds in a particular implementation. See FIGS. 9C and 9D for result codes used in that particular implementation. If a proper connection is made, the RF modems 22, 106 then operate in a pass-through mode, emulating a cable connection between the mobile terminal 12 and the crossconnect base station 14. This communication typically commences by propagating, from the RF modem 22 in the telephone craft technician's service vehicle, a radio frequency communication signal including telephone modem commands (Hayes AT commands in the particular implementation). The propagated radio frequency communication signal is received by the RF modem 106 at the selected crossconnect box. In response, the crossconnect base station 14 passes on the communicated commands to the base station's built in telephone line modem 112 which is connected to POTS line 1 in FIG. 5. The telephone craft technician is able to, through the RF connection, cause the telephone line modem 112 to go off-hook, dial, transmit and receive data, and then go on-hook again. The RF connection between the mobile terminal and the base station is maintained until the service vehicle moves out of range, or the mobile terminal is powered down or a predetermined amount of time passes without any communication from the mobile terminal. Upon disconnecting, the base station 14 enters the charging mode.

When the crossconnect base station 14 is idle and in the charging mode, it periodically dials itself using the two connected POTS lines as previously explained, and uses the line current from the telephone network to charge the battery. This dialing occurs periodically in accordance with a selected predetermined number of minutes. Dialing occurs under control of the microprocessor based control unit 116, which causes the generation and sending of the telephone number for POTS line 2 via the telephone line modem 112 connected to the wire pair of POTS line 1. If charging is to occur by drawing electrical current from the telephone system batteries connected to POTS lines 1 and 2, then the call is answered at POTS line 2 as explained above. If charging is to occur by using the electrical ringing signal conventionally generated by the telephone system when the call to POTS line 2 is placed, the POTS line 2 is maintained in an on-hook condition so that the call is not answered; this allows the ringing signal to be generated for the maximum time period permitted by the telephone system.

The foregoing is shown in a more detailed, but self-explanatory manner in FIGS. 7–9 (in FIG. 9A, however, there is a reference to a "supervisory computer"—this is contemplated as a computer with a modem at a location to which each base station could call periodically, such as once a day, and upload maintenance and usage data, such as battery usage, battery charge level, number of accesses, length of each access, etc., thereby allowing for statistical analysis of base station usage without having to physically access the base stations; this is separate and distinct from, but can also be provided in, the communications with the telephone company equipment such as the maintenance system 4).

Voice Communication

Although the preferred embodiment described above has been explained with reference to data communications, the present invention also encompasses voice communications. Such function can be implemented in any suitable manner. A presently contemplated implementation is to use a plug-in board that interfaces to the base station 4 through the expansion port shown in FIG. 6E. This circuit includes a parallel interface, voice compression/codec circuitry and a two-wire/four-wire interface for attachment to POTS line 2 connected to the base station 14. In the mobile unit, voice communications are contemplated to be implemented in a "truck mount" version similar to the circuitry of the base station 14 maintained in a fixed mount in the vehicle 10. In this truck-mounted mobile unit, a plug-in board interfaces through the expansion port comparable to that shown in FIG. 6E but within the truck-mount mobile unit. This circuit also includes a parallel interface, voice compression/codec circuitry and a two-wire/four-wire interface and loop current supply that attaches to a telephone technician's butt-set through an interface connector.

Thus, the present invention is well adapted to carry out the objects and attain the ends and advantages mentioned above as well as those inherent therein. While preferred embodiments of the invention have been described for the purpose of this disclosure, changes in the construction and arrangement of parts and the performance of steps can be made by those skilled in the art, which changes are encompassed within the spirit of this invention as defined by the appended claims.

Resistor/Capacitor Values for FIGS. 3 and 6

FIG. 3

R1 =2kΩ
R2 =1kΩ
R3 =1kΩ
R4 =3.09kΩ, 1%
R5 =11kΩ, 1%
R6 =45.3kΩ, 1%
R7 =1kΩ
R8 =10kΩ
R9 =10kΩ

—continued

Resistor/Capacitor Values for FIGS. 3 and 6

R1 =1kΩ
R2 =1kΩ
R3 =1kΩ
R4 =100kΩ
R5 =11kΩ, 1%
R6 =47Ω
R7 =5.1kΩ
R8 =5.1kΩ
R9 =47kΩ
R10 =10kΩ
R27 =47Ω
R29 =470kΩ
C1 =22pF
C2 =22pF
C3 =22pF
C4 =22pF
C5 =VAL
C6 =10pF/10 v
C7 =1pF
C8 =20pF
C9 =20pF
C18 =1pF/6 v
C22 =0.1pF

FIG. 6D

R14 =10Ω
R15 =10Ω
R16 =1MΩ
R17 =1MΩ
R18 =1MΩ, 1%
R19 =1MΩ, 1%
R20 =309kΩ, 1%
R21 =215kΩ, 1%
R22 =332kΩ, 1%
R23 =332kΩ, 1%
R24 =1MΩ, 1%
R25 =1MΩ, 1%
C12 =10 μF, 10 V
C13 =0.1 μF
C14 =50 μF/150 V
C15 =50 μF/150 V
C16 =10 μF/6 v
C17 =100 μF/6.3 V
C19 =0.1 μF
C20 =0.1 μF
C21 =0.1 μF
C29 =10 μF/16 v

What is claimed is:

1. A system for providing wireless access to a telephone line of a telephone network, comprising:

a mobile terminal, including means for transmitting a radio frequency signal carrying a data or voice communication; and a plurality of crossconnect base stations, each disposed at a respective crossconnect box connected by a respective plurality of telephone lines to a central office of a telephone network, and each crossconnect base station including:

means for connecting to at least one of the telephone lines at the respective crossconnect box;

means for receiving the radio frequency signal carrying a data or voice communication; and means for communicating the data or voice communication over a telephone line connected to said means for connecting.

2. The system defined in claim 1, wherein each said crossconnect base station further includes:

a power supply; and means for energizing the respective said crossconnect base station with said power supply in response to a control signal propagated by said mobile terminal at a different frequency than the radio frequency signal.

3. A system for providing wireless access to a telephone line of a telephone network, comprising:

a mobile terminal, including means for transmitting a radio frequency signal carrying a telephone communication; and a crossconnect base station, including:

means for connecting to a telephone line at a crossconnect box of a telephone network;

means for receiving the radio frequency signal carrying a telephone communication;

means for communicating the telephone communication over a telephone line connected to said means for connecting;

a power supply; and means for energizing said crossconnect base station with said power supply in response to a control signal propagated by said mobile terminal;

wherein said means for receiving the radio frequency signal includes:

a single antenna;

a radio frequency modem; and switch means for selectably connecting said single antenna either to said radio frequency modem or to said means for energizing said crossconnect base station with said power supply.

4. The system as defined in claim 2, wherein each said crossconnect base station still further includes means for recharging said power supply from an energy source of the telephone network connected to a telephone line connected to said means for connecting.

5. A system for providing wireless access to a telephone line of a telephone network, comprising:

a mobile terminal, including means for transmitting a radio frequency signal carrying a telephone communication; and a crossconnect base station, including:

means for connecting to a telephone line at a crossconnect box of a telephone network;

means for receiving the radio frequency signal carrying a telephone communication;

means for communicating the telephone communication over a telephone line connected to said means for connecting;

a power supply; and means for energizing said crossconnect base station with said power supply in response to a control signal propagated by said mobile terminal; and means for recharging said power supply from an energy source of the telephone network connected to a telephone line connected to said means for connecting;

wherein said means for recharging said power supply includes:

means for connecting to a second telephone line at the crossconnect box of the telephone network:

first recharging circuit means for connecting said first-mentioned means for connecting, and a first telephone line connected thereto, to said power supply; and second recharging circuit means for connecting said second-mentioned means for connecting, and a second telephone line connected thereto, to said power supply.

6. The system as defined in claim 5, wherein said first and second recharging circuits are connected in electrical parallel to said power supply.

7. A system for providing wireless access to dial tone of a telephone network, comprising:

a mobile terminal for a telephone craft technician, said mobile terminal including:

a wakeup transmitter;

a first radio frequency modem; and a first controller connected to said wakeup transmitter and said first radio frequency modem; and a crossconnect base station for connecting to a telephone line at a crossconnect box of a telephone network, said crossconnect base station including:

a wakeup receiver responsive to said wakeup transmitter;

a second radio frequency modem responsive to said first radio frequency modem;

a telephone line modem for the telephone line; and a second controller connected to said wakeup receiver, said second radio frequency modem, and said telephone line modem.

8. The system as defined in claim 7, wherein said crossconnect base station further includes a single antenna and means for connecting said single antenna to at least one of said wakeup receiver and said second radio frequency modem.

9. The system as defined in claim 8, wherein said crossconnect base station further includes:

a rechargeable battery; and a recharging circuit connected to said second controller and said battery, said recharging circuit having inputs for connecting to two telephone lines at the crossconnect box of the telephone network so that said recharging circuit conducts recharging current to said battery from the telephone network.

10. The system as defined in claim 9, wherein said second controller includes a first universal asynchronous receiver transmitter and a second universal asynchronous receiver transmitter connected serially between said first universal asynchronous receiver transmitter and said telephone line modem.

11. The system as defined in claim 7, wherein said crossconnect base station further includes:

a rechargeable battery; and a recharging circuit connected to said second controller and said battery, said recharging circuit having inputs for connecting to two telephone lines at the crossconnect box of the telephone network so that said recharging circuit conducts recharging current to said battery from the telephone network.

12. The system as defined in claim 11, wherein said crossconnect base station further includes means for controlling the energization of said wakeup receiver, said second radio frequency modem, said telephone line modem, and said second controller.

13. The system as defined in claim 7, wherein said second controller includes a first universal asynchronous receiver transmitter and a second universal asynchronous receiver transmitter connected serially between said first universal asynchronous receiver transmitter and said telephone line modem.

14. A method for a telephone craft technician to remotely communicate data or voice communications over a telephone line connected to a central office of a telephone network, comprising:

propagating, from a telephone craft technician's mobile computer device when the computer device is within a communication range of a selected crossconnect box connected to a plurality of telephone lines of a telephone network, a radio frequency communication signal including modem commands;

receiving, at the selected crossconnect box, the propagated radio frequency communication signal, and in response thereto transferring the modem commands of the communication signal to a modem connected to at least one telephone line of the plurality of telephone lines at the crossconnect box so that the modem executes the modem commands to go off-hook, dial, and transmit and receive data or voice communications over the connected telephone line; and propagating further radio frequency communication signals between the computer device and the crossconnect box for communicating between the computer device and the telephone line.

15. The method as defined in claim 14, further comprising conducting on-going bi-directional communications between the computer device and the called telephone number until either the computer device is moved out of the communication range of the selected crossconnect box or the communication from the computer device ceases for a predetermined time period.

16. The method as defined in claim 14, further comprising:

propagating, from the telephone craft technician's mobile computer device, a radio frequency wakeup signal when the computer device is within the communication range of the selected crossconnect box; and receiving, at the selected crossconnect box, the propagated radio frequency wakeup signal and energizing the crossconnect base station in response thereto.

17. The method as defined in claim 16, wherein the radio frequency wakeup signal and the radio frequency communication signal are transmitted at different frequencies but are received at the selected crossconnect box through the same antenna connected to the crossconnect base station.

18. The method as defined in claim 14, wherein the crossconnect base station includes a rechargeable battery and said method further comprises recharging the battery from an energy source of the telephone network through two separate telephone lines of the plurality of telephone lines at the crossconnect box.

19. A method for a telephone craft technician to remotely communicate over a telephone line, comprising:

propagating, from a telephone craft technician's service vehicle when the service vehicle is within a communication range of a selected crossconnect box of a telephone network, a radio frequency communication signal including modem commands;

receiving, at the selected crossconnect box, the propagated radio frequency communication signal, and in response thereto transferring the modem commands of the communication signal to a modem connected to a telephone line at the crossconnect box so that the modem executes the modem commands to go off-hook, dial, and transmit and receive over the connected telephone line;

propagating further radio frequency communication signals between the service vehicle and the crossconnect box for communicating between the service vehicle and the telephone line; and recharging a rechargeable battery in the crossconnect base station from an energy source of the telephone network, including:

from the crossconnect base station, placing the telephone line in an off-hook condition and sending a predetermined telephone number over the telephone line to connect the telephone line to a second telephone line connected to the crossconnect base station at the selected crossconnect box; and conducting electrical current received from the two connected telephone lines to the battery.

20. A method for a telephone craft technician to remotely communicate over a telephone line, comprising:

propagating, from a telephone craft technician's service vehicle when the service vehicle is within a communication range of a selected crossconnect box of a telephone network, a radio frequency communication signal including modem commands;

receiving, at the selected crossconnect box, the propagated radio frequency communication signal, and in response thereto transferring the modem commands of the communication signal to a modem connected to a telephone line at the crossconnect box so that the modem executes the modem commands to go off-hook, dial, and transmit and receive over the connected telephone line;

propagating further radio frequency communication signals between the service vehicle and the crossconnect box for communicating between the service vehicle and the telephone line; and recharging a rechargeable battery in the crossconnect base station from an energy source of the telephone network, including:

from the crossconnect base station, placing the telephone line in an off-hook condition and sending a predetermined telephone number over the telephone line to connect the telephone line to a second telephone line connected to the crossconnect base station at the selected crossconnect box so that an alternating current electrical ringing signal is generated; and providing at the crossconnect base station an electrical charging current to the battery in response to the alternating current electrical ringing signal.

* * * * *

UNITED STATES PATENT AND TRADEMARK OFFICE
CERTIFICATE OF CORRECTION

Patent No.: 5,896,569

Dated: April 20, 1999

Inventors: Myron C. Butler, Lawrence O. Hilligoss and George Alter

It is certified that errors appear in the above-identified patent and that said Letters Patent is hereby corrected as shown below:

Column 11, line 16, insert a new paragraph beginning with the word "still" and change "still" to --Still--.

Column 14, line 10, change "R26 =" to --R26 = 1MΩ--.

Column 14, line 31, change "C6 = 10pF/10 v" to --C6 = 10μF/10 v--.

Column 14, line 32, change "C7 = 1pF" to --C7 = 1μF--.

Column 14, line 35, change "C18 = 1pF/6 v" to --C18 = 1μF/6 v--.

Column 14, line 36, change "C22 = 0.1pF" to --C22 = 0.1μF--.

Signed and Sealed this

Eighth Day of February, 2000

Attest:

Attesting Officer

Q. TODD DICKINSON

Commissioner of Patents and Trademarks